US008524173B2

(12) United States Patent
Yamanaka et al.

(10) Patent No.: US 8,524,173 B2
(45) Date of Patent: Sep. 3, 2013

(54) MICROCHANNEL STRUCTURE AND FINE-PARTICLE PRODUCTION METHOD USING THE SAME

(75) Inventors: Maho Yamanaka, Isehara (JP); Akira Kawai, Shunan (JP); Koji Katayama, Yamato (JP); Hiroki Takamiya, Sagamihara (JP)

(73) Assignee: Tosoh Corporation, Shunan-shi (JP)

( * ) Notice: Subject to any disclaimer, the term of this patent is extended or adjusted under 35 U.S.C. 154(b) by 867 days.

(21) Appl. No.: 11/847,788

(22) Filed: Aug. 30, 2007

(65) Prior Publication Data

US 2008/0223720 A1 Sep. 18, 2008

(30) Foreign Application Priority Data

Sep. 1, 2006 (JP) .................................. 2006-237842

(51) Int. Cl.
*B01F 3/08* (2006.01)
(52) U.S. Cl.
USPC ........ 422/544; 422/502; 422/504; 366/176.1; 366/340; 366/348; 516/21; 516/28; 516/29; 516/53; 264/11; 264/14; 425/6; 137/14; 222/420; 222/421
(58) Field of Classification Search
USPC ................... 222/134; 204/451, 601
See application file for complete search history.

(56) References Cited

U.S. PATENT DOCUMENTS

| | | | | |
|---|---|---|---|---|
| 4,201,691 A | * | 5/1980 | Asher et al. ...................... 516/10 |
| 5,326,484 A | * | 7/1994 | Nakashima et al. ............. 516/29 |
| 5,730,187 A | * | 3/1998 | Howitz et al. .................. 137/803 |
| 6,004,515 A | | 12/1999 | Parce et al. |
| 6,576,023 B2 | * | 6/2003 | Nakajima et al. ................ 264/14 |
| 7,718,099 B2 | * | 5/2010 | Kawai et al. ..................... 264/11 |
| 2002/0195463 A1 | * | 12/2002 | Seki et al. ....................... 222/134 |
| 2004/0037161 A1 | * | 2/2004 | Honda et al. ................ 366/176.1 |
| 2004/0228882 A1 | | 11/2004 | Qiu et al. |
| 2006/0079583 A1 | * | 4/2006 | Higuchi et al. .................. 516/53 |
| 2006/0083661 A1 | * | 4/2006 | Chun et al. ..................... 422/100 |
| 2006/0101775 A1 | * | 5/2006 | Miyake et al. ................... 52/710 |

FOREIGN PATENT DOCUMENTS

| | | |
|---|---|---|
| CN | 1720266 A | 1/2006 |
| GB | 2 392 397 A | 3/2004 |
| JP | 8-508197 | 9/1996 |
| JP | 10-274638 | 10/1998 |
| JP | 2975943 | 9/1999 |

(Continued)

OTHER PUBLICATIONS

U.S. Appl. No. 12/572,772, filed Oct. 2, 2009, Kawai, et al.

(Continued)

*Primary Examiner* — Jill Warden
*Assistant Examiner* — Timothy G Kingan
(74) *Attorney, Agent, or Firm* — Oblon, Spivak, McClelland, Maier & Neustadt, L.L.P.

(57) ABSTRACT

A microchannel structure including a dispersed-phase introduction channel which communicates with a dispersed-phase introduction inlet; a continuous-phase introduction channel which communicates with a continuous-phase introduction inlet; a discharge channel which communicates with a discharge outlet; a fine-particle formation channel; and a plurality of branch channels for dispersed-phase introduction which are microchannels; wherein one end of the fine-particle formation channel in a fluid traveling direction communicates with the continuous-phase introduction channel whereas the other end thereof communicates with the discharge channel; and wherein a side part of the dispersed-phase introduction channel and side part of the fine-particle formation channel communicate via the plurality of branch channel for dispersed-phase introduction.

15 Claims, 13 Drawing Sheets

(56) References Cited

FOREIGN PATENT DOCUMENTS

| | | |
|---|---|---|
| JP | 2002-139419 | 5/2001 |
| JP | 2002-503334 | 1/2002 |
| JP | 2002-055098 | 2/2002 |
| JP | 2002-119841 | 4/2002 |
| JP | 2002-347093 | 12/2002 |
| JP | 2003-004700 | 1/2003 |
| JP | 2004-122107 | 4/2004 |
| JP | 2004-243308 | 9/2004 |
| JP | 2004-325304 | 11/2004 |
| JP | 3746766 | 12/2005 |
| WO | 94/21372 | 9/1994 |
| WO | 98/10267 | 3/1998 |
| WO | WO 03/106386 A2 | 12/2003 |

OTHER PUBLICATIONS

Hideaki Hisamoto, et al., "Fast and high conversion phase-transfer synthesis exploiting the liquid-liquid interface formed in a microchannel chip" Chem. Commun., 2001, pp. 2662-2663.

T. Nishisako, et al., "Submerged production of microdroplets in microchannels", Proceedings of the $4^{th}$ International Symposium Microchemistry and Microsystems, 2001, p. 59 (with English translation).

Kikutani, et al., "High yield synthesis in microchannels using a pile-up microreactor", Proceedings of the $3^{rd}$ International Symposium Microchemistry and Microsystems, 2001, p. 9, (with English translation).

A. Kawai, et al. "Mass-production system of nearly monodisperse diameter gel particles using droplets formation in a microchannel", μ-TAS, vol. 1, 2002, pp. 368-370.

Chinese Office Action issued Nov. 11, 2010, in Patent Application No. 200710182160.2 (with English-language translation).

Japanese Office Action mailed on Sep. 20, 2011 issued for JP. Application No. 2007-223720 (with English Translation).

International Search Report mailed Apr. 25, 2013 in European Patent Application No. 07115399.3.

* cited by examiner

13

US 8,524,173 B2

MICROCHANNEL STRUCTURE AND FINE-PARTICLE PRODUCTION METHOD USING THE SAME

BACKGROUND OF THE INVENTION

1. Field of the Invention

The present invention relates to a method in which fine particles used in column fillers for fractionation/separation; microcapsules used in drugs, enzyme-containing capsules, cosmetics, perfumes, labeling/recording materials, adhesives, agricultural chemicals, or the like; and fine particles used in chemical reactions, solvent extractions, or the like; are stably produced in uniform sizes in a large amount. In addition, the present invention relates to a microchannel structure, microchannel structural body, and microchannel-structure laminated body for producing the above fine particles.

Priority is clamed on Japanese Patent Application No. 2006.237842, filed Sep. 1, 2006, the content of which is incorporated herein by reference.

2. Description of the Related Art

In recent years, the study using a microchannel structure, which includes a microchannel having a length of about a few centimeters and a width and depth in the range of submicrometers to a few hundreds of micrometers on a glass substrate of a few centimeters square, to carry out chemical reactions or productions of fine particles by introducing fluids to the microchannel has attracted attention. It has been suggested that efficient chemical reactions can be carried out using such microchannel structures due to the effects of a short intermolecular distance and a large specific interfacial area in the microspace therein (for example, refer to non-patent document 1).

In addition, it is possible to produce fine particles with an extremely uniform particle diameter by introducing two kinds of liquids having different interfacial tensions to a channel which has a joining section (for example, refer to non-patent document 2 and patent documents 1 and 2). Note that the term fine "particles" used here also includes fine particles, in which only the microdroplets or the surface of microdroplets are hardened (hereinafter referred to as "semi-hardened"), and the semi-solid fine particles having considerably high viscosity, other than the solid fine particles.

The above documents describe, for example, the T-shaped microchannel structure shown in FIG. 1, FIG. 2 which is an A-A' cross section of FIG. 1, and FIG. 3 which is a B-B' cross section of FIG. 1. As the figures show, the microchannel structure has a continuous-phase introduction inlet (2), a continuous-phase introduction channel (3), a dispersed-phase introduction inlet (4), a dispersed-phase introduction channel (5), a discharge channel (7), and a discharge outlet (8) on a microchannel substrate (I) and there is a joining section (6) where the introduced continuous-phase and dispersed-phase join hereinafter referred to as the "joining section"). By supplying solution while controlling the flow rates of dispersed phase and continuous phase using a T-shaped microchannel structure, in which the depth of each channel is 100 μm, the width of the introduction channel where the dispersed phase is introduced is 100 μm, and the width of the introduction channel where the continuous phase is introduced is 300 to 500 μm, it is possible to produce extremely uniform fine particles in the joining section. Additionally, it is also possible to control the particle diameter of the produced fine particles by controlling the flow volumes of dispersed phase and continuous phase.

However, his method has the following problems. That is, in this method, the flow volumes of dispersed phase and continuous phase are controlled by changing the respective supply rate thereof in order to control the size of the fine particles, and thus slight changes in the supply rates of dispersed phase and continuous phase lead to changes in particle size. This results in difficulties in controlling particle diameter stably and also in obtaining fine particles with uniform particle diameters.

Additionally, the chemical reactions in microchannels and studies to industrially produce fine particles have also been carried out while exploiting the characteristics of microspace such as the capability for cog out efficient chemical reactions due to the aforementioned effects of short intermolecular distance and large specific interfacial area in the microspace and the capability for producing fine particles with extremely uniform particle diameters by introducing two kinds of liquids having different interfacial tensions to a channel which has a joining section. In this case, due to the small size of the microspace, the amount of fine-particle production per unit time is inevitably small in a single microchannel structure. However, when it is possible to range numerous microchannel structures in parallel, the amount of fine-particle production per unit time can be increased while exploiting the aforementioned characteristics of microchannel structures (for example, refer to non-patent documents 3 and 4). As shown in non-patent document 3, attempts have been made to laminate the microchannel substrates having one microchannel by connecting them via a longitudinal hole which penetrates the common parts such as an inlet of reaction solutions and outlet of reaction products. It is said that chemical reactions and fine-particle production on an industrial scale while exploiting such characteristics of the microspace is possible by increasing the degree of integration of microchannel structures which are the minimum unit 2 dimensionally or by laminating the microchannel structures 3 dimensionally. However, it has conventionally been difficult to distribute fluids uniformly to the microchannels arranged in 2 or 3 dimensions, and thus improvements thereof have been required together with the further improvements in the degree of integration of microchannel structures.

[Patent document 1] Japanese Patent Publication No. 2975943

[Patent document 2] Japanese Patent Publication No. 3746766

[Non-patent docent 1] Hisamoto A. et al. "Fast and high conversion phase-transfer synthesis exploiting the liquid-liquid interface formed in a microchannel chip", Chem. Commun., 2001, p 2662-2663

[Non-patent document 2] Nishisako T. et al. "Submerged production of microdroplets in microchannels" Proceeding of the 4th International Symposium Microchemist and Microsystems, p. 59, 2001

[Non-patent document 3] Kikutani et al. "High yield synthesis in microchannels using a pileup microreactor" Proceedings of the 3rd International Symposium Microchemistry and Microsystems, p. 9, 2001

[Non-patent document 4] Kawai A. et al. "Mass-production system of nearly monodisperse diameter gel particles using droplets formation in a microchannel", μ-TAS 2002 vol. 1 p 368-370

SUMMARY OF THE INVENTION

The present invention is proposed in view of such conventional circumstances and its object is to provide a microchannel structure, microchannel structural body, microchannel-structure laminated body, and fine-particle production method which are for realizing the stable production of fine particles having uniform sizes and the production of fine particles in a large amount.

The present inventors discovered the use of the following can solve the abovementioned problems, which are associated with conventional Techniques, to complete the present invention. That is, (1) A microchannel structure having a dispersed-phase introduction channel which communicates with a dispersed-phase introduction inlet continuous-phase introduction channel which communicates with a continuous-phase introduction inlet, discharge channel which communicates with a discharge outlet, fine-particle formation channel, and a plurality of branch channels for dispersed-phase introduction which are microchannels, and in which one end of the fine-particle formation channel in the fluid traveling direction communicates with the continuous-phase introduction channel whereas the other end thereof communicates with the discharge channel, and in which the side part of the dispersed-phase introduction channel and side part of the fine-particle formation channel communicate via the branch channels for dispersed-phase introduction; and (2) A fine-particle production method in which the dispersed phase and continuous phase merge at the joining section of a branch channel for dispersed-phase introduction and fine-particle formation channel to form fine particles from the dispersed phase using the above microchannel structure (1). The present invention will be described in detail below.

The microchannel structure of the present invention is a microchannel structure having a dispersed-phase introduction channel which communicates with a dispersed-phase introduction inlet, continuous-phase introduction channel which communicates with a continuous-phase introduction inlet, discharge channel which communicates with a discharge outlet, fine-particle formation channel, and a plurality of branch channels for dispersed-phase introduction which are microchannels, and characterized in that one end of the fine-particle formation channel in the fluid traveling direction communicates with the continuous-phase introduction channel whereas the other end thereof communicates with the discharge channel, and that the side part of the dispersed-phase introduction channel and side part of the fine-particle formation channel communicate via the branch channels for dispersed-phase introduction to constitute one unit.

Additionally, the microchannel structure of the present invention is the above microchannel structure characterized in that a branch channel for dispersed-phase introduction and the aforementioned fine-particle formation channel join at an arbitrary angle.

In addition, the microchannel structure of the present invention is the above microchannel structure characterized in that the cross sectional area of the branch channel for dispersed-phase introduction is smaller than the cross sectional area of the fine-particle formation channel.

Additionally, the microchannel structure of the present invention is the above microchannel structure characterized in that the cross sectional area of the fine-particle formation channel gradually increases or remains the same from the communication position thereof with the continuous-phase introduction channel to the communication position thereof with the discharge channel.

In addition, the microchannel structure of the present invention is the above microchannel structure characterized in that the lengths of the branch channels for dispersed-phase introduction gradually increase or remain the same as the communication position of the branch channel for dispersed-phase introduction with the dispersed-phase introduction channel departs from the dispersed-phase introduction inlet.

Additionally, the microchannel structure of the present invention is the above microchannel structure in which n branch channels for dispersed-phase introduction (i.e. from $Y_1$, which is the closest branch channel for dispersed-phase introduction to the dispersed-phase introduction inlet, to $Y_a$, which is the furthest branch channel for dispersed-phase introduction from the dispersed-phase introduction inlet) communicate from the dispersed-phase introduction channel to the fine-particle formation channel and character by the following. That is, when the position of dispersed-phase introduction inlet is $X_0$, position where $Y_1$ and dispersed-phase introduction channel communicate is $X_1$, length along the dispersed-phase introduction channel between $X_0$ and $X_1$ is $a_1$, position where $Y_n$ and dispersed-phase introduction channel communicate is $X_n$, and length along the dispersed-phase introduction channel between $X_{n-1}$ and $X_n$ is $a_n$, the lengths from $a_2$ to $a_n$ are all equal.

Additionally, the microchannel structure body of the present invention is a microchannel structural body characterized in that two or more of the above microchannel structures are formed on a substrate of the microchannel structural body and also the aforementioned two or more microchannel are rearranged at an equal interval.

In addition, the microchannel structural body of the present invention is the above microchannel structural body characterized in that two or more of the above microchannel structures are formed on a substrate of the microchannel structural body.

Additionally, the microchannel structural body of the present invention is the above microchannel structural body characterized in that two or more of the above microchannel structural bodies are arranged at an equal interval.

In addition, the microchannel structural body of the present invention is the above microchannel structural body characterized in that all the dispersed-phase introduction channel, continuous-phase introduction channel, fine-particle formation channel, discharge channel, and branch channels for dispersed-phase introduction are formed on one substrate.

Additionally, the microchannel structural body of the present invention is the above microchannel structural body characterized in that the dispersed-phase introduction channel, continuous-phase introduction channel, fine-particle formation channel, discharge channel, and branch channel for dispersed-phase introduction are formed by being dispersed on two or more substrates.

In addition, the microchannel structure of the present invention is the above microchannel structure characterized in that all the dispersed-phase introduction channel, continuous-phase introduction channel fine-particle formation channel, discharge channel, and branch channel for dispersed-phase introduction have different widths and depths or have two or more different widths and depths.

Additionally, the microchannel structural body of the present invention is the above microchannel structural body characterized in that all the dispersed-phase introduction channel, continuous-phase introduction channel, fine-particle formation channel, discharge channel, and branch channel for dispersed-phase introduction have different widths and depths or have two or more different widths and depths.

In addition, the microchannel structural body of the present invention is a microchannel-structure laminated body which is a microchannel-structure laminated body in which two or more of the above microchannel structural bodies are laminated and characterized in that a dispersed-phase introduction inlet, continuous-phase introduction inlet, and discharge outlet in said microchannel structural body penetrate the substrate of the microchannel structural body.

Additionally, the microchannel structure of the present invention is the above microchannel structure characterized in that the width of the branch channel for dispersed-phase introduction or the width of the fine-particle formation channel is partially reduced at the joining section where the branch channel for dispersed-phase introduction and fine-particle formation channel join or in the vicinity thereof.

In addition, the microchannel structural body of the present invention is the above microchannel structural body characterized in that the width of the branch channel for dispersed-phase introduction or the width of the fine-particle formation channel is partially red at the joining section where the branch channel for dispersed-phase introduction and fine-particle formation channel join or in the vicinity thereof.

Additionally, the microchannel-structure laminated body of the present invention is the above microchannel-structure laminated body characterized in that the width of the branch channel for dispersed-phase introduction or the width of the mine-particle formation channel is partially reduced at the joining section where the branch channel for dispersed-phase introduction and fine-particle formation channel join or in the vicinity thereof.

In addition, the fine-particle production method of the present invention is a method for producing fine particles using the abovementioned microchannel structure and characterized in that a dispersed phase and continuous phase are merged at a joining section of the branch channel for dispersed-phase introduction and fine-particle formation channel to produce fine particles from the dispersed phase.

Additionally, the fine-particle production method of the present invention is the above fine-particle production method characterized in that the particle diameters of the produced fine particles are controlled by changing the angle where the branch channel for dispersed-phase introduction and fine-particle formation channel join.

BRIEF DESCRIPTION OF THE REFERENCE SYMBOLS

Figure 1:
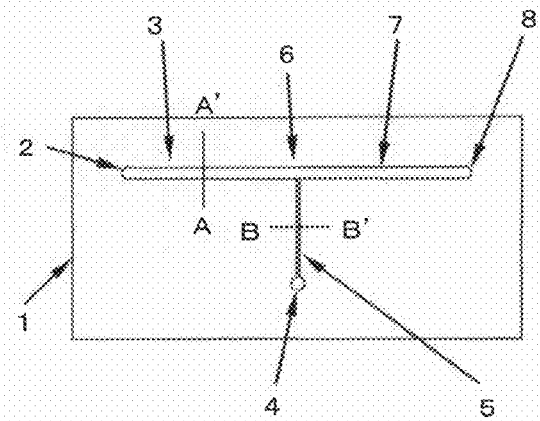
FIG. 1 is a schematic diagram showing a conventional microchannel structure for producing fine particles.
Figure 2:
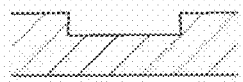
FIG. 2 is a cross sectional diagram along the line A-A' of FIG. 1.
Figure 3:
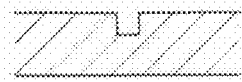
FIG. 3 is a cross sectional diagram along the line B-B' of FIG. 1.

1. Microchannel substrate
2. Continuous-phase introduction inlet
3. Continuous-phase introduction channel
4. Dispersed-phase introduction inlet
5. Dispersed-phase introduction channel
6. Joining section
7. Discharge channel
8. Discharge outlet
9. Fine-particle formation channel
10. Branch channel for dispersed-phase introduction
11. Continuous phase
12. Dispersed phase
13. Fine particle
14. Microchannel
15. Through hole
16. Cover body
17. Lid substrate
18. Bottom substrate
19. Continuous-phase reservoir
20. Dispersed-phase reservoir
21. Supply channel 22. Channel substrate for supplying continuous phase
23. Channel substrate for supplying dispersed phase
24. Through hole in reservoir of channel substrate for supplying continuous phase
25. Through hole in reservoir of channel substrate for supplying dispersed phase
26. Fluid discharge outlet

DETAILED DESCRIPTION OF THE INVENTION

The microchannel structure, microchannel structural body, and microchannel-structure laminated body of the present invention will be described in further detail below by using figures.

Figure 4:
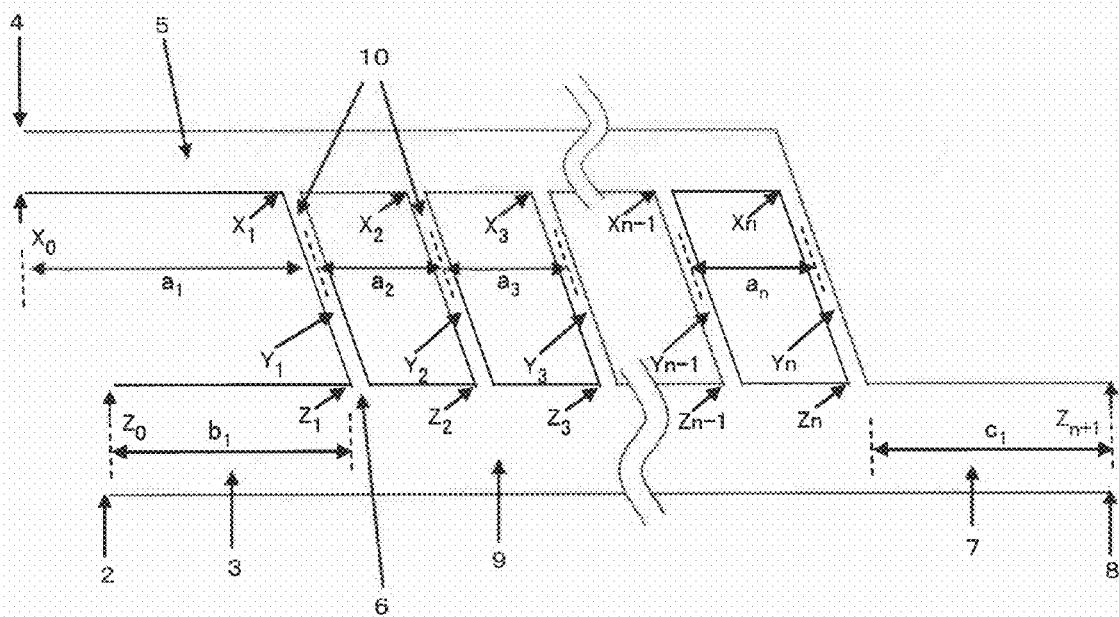
FIG. 4 is a schematic diagram showing a basic microchannel sc of the present invention.
Figure 5:
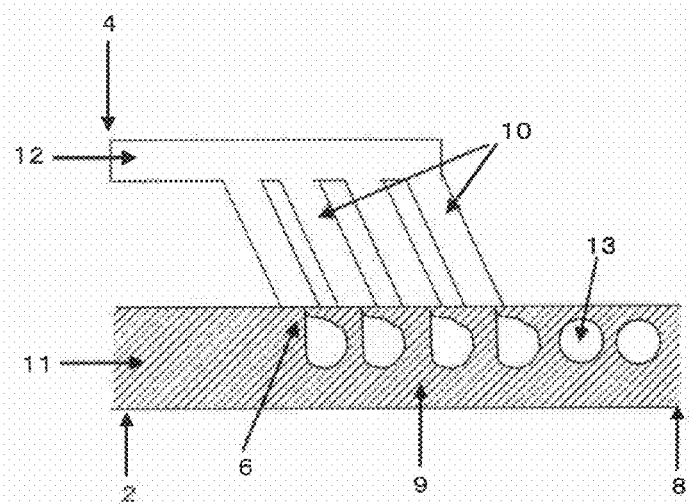
FIG. 5 is a schematic diagram showing a method to produce fine particles using the microchannel structure shown in FIG. 4.

FIG. 4 shows the most basic schematic diagram of a microchannel structure of the present invention. As shown in FIG. 4, the microchannel structure of the present invention is a microchannel structure having a dispersed-phase introduction channel (5) which communicates with a dispersed-phase introduction inlet (4), continuous-phase introduction channel (3) which communicates with a continuous-phase introduction inlet (2), discharge channel (7) which communicates with a discharge outlet (8), fine particle formation channel (9), and branch channels for dispersed-phase introduction (10) which are microchannels. In the microchannel structure, one end of the fine-particle formation channel (9) in the fluid traveling direction communicates with the continuous-phase introduction channel (3) whereas the other end thereof communicates with the discharge channel (7), and the side part (in the substrate plane direction) of the dispersed-phase introduction channel (5) and side part (in the substrate plane direction) of the fine-particle formation channel (9) communicate via the branch channels for dispersed-phase introduction (10) and they are arranged on a substrate.

The term "microchannel" used in the present invention refers to a channel having a width of submicrons to 1 mm, depth of about submicrons to 1 mm, and length of about a few millimeters to a few centimeters although the length is not particularly limited. In addition, the term "channel" used in the present invention refers, in many cases, to a channel having a width, depth, and length which are the same or larger than those of microchannels, although the term "channel" may include microchannels at times. The aforementioned dispersed-phase introduction channel, continuous-phase introduction channel, discharge channel, and fine-particle formation channel may be microchannels or channels. Additionally, the aforementioned branch channel for dispersed-phase introduction is preferably a microchannel.

Although the microchannel structure of the present invention is a microchannel structure in which the cross sectional area of the branch channel for dispersed-phase introduction is smaller than that of the fine-particle formation channel, the width and depth of the branch channel for dispersed-phase introduction are preferably about a few micrometers to a few tens of micrometers and the width and depth of the fine-particle formation channel are preferably about a few tens of micrometers to 1 mm. In addition, although the widths and depths of the dispersed-phase introduction channel and continuous-phase introduction channel are not particularly limited, they are preferably about a few tens of micrometers to 1 mm as those of the fine-particle formation channel. Additionally, although the width and depth of the discharge channel are not particularly limited either, they are preferably about a few tens of micrometers to 1 mm as those of the fine-particle formation channel.

The sizes and shapes of the dispersed-phase introduction inlet and continuous-phase introduction inlet are not particularly limited as long as they can introduce predetermined fluids to the dispersed-phase introduction channel and continuous-phase introduction channel respectively. Examples thereof include an inlet having a circular shape with a diameter of about 1.5 mm. In addition, the size and shape of the discharge outlet is not particularly limited as long as it can discharge continuous phase and the continuous phase containing the produced fine particles. Examples thereof include an outlet having a circular shape with a diameter of about 1.5 mm as that of the dispersed-phase introduction inlet and continuous-phase introduction inlet. The term "fluids" used in the present invention refers to a dispersed phase, a continuous phase, and the continuous phase containing the produced fine particles.

The term "fine particles" used in the present invention refers to the fine particles produced by the continuous phase shearing the dispersed phase in the microchannel. Although tee size of the fine particles is not particularly limited, the present invention is suited for producing fine particles having the size of a few micrometers to a few hundreds of micrometers and is even more suited for producing fine particles having the size of 10 µm to 100 µm. Additionally, the fine particles in the present invention also include, other than the solid fine particles, microdroplets, semi-hardened fine particles where only the surface of microdroplets are hardened, and the semi-solid fine particles having considerably high viscosity.

The dispersed phase used in the present invention is a liquid material for constituting the fine particles produced by the microchannel structure of the present invention. Examples thereof include a medium in which materials for gel production such as monomers for polymerization like styrene, crosslinking agents like divinylbenzene, and polymerization initiators are dissolved in an appropriate solvent. The object of the present invention is to produce fine particles efficiently and the dispersed phase is not particularly limited as long as it can be supplied via the channels in the microchannel structure for the sake of achieving the above object and, furthermore, the component of the dispersed phase is not particularly limited either as long as it can form fine particles. In addition, the dispersed phase may be a slurry material where solid matter such as fine powders are mixed in the dispersed phase, a laminar flow in which the dispersed phase is formed from a plurality of fluids, or a mixed fluid or a suspension (emulsion) formed from a plurality of fluids.

The continuous phase used in the preset invention is a liquid material used for producing fine particles from the dispersed phase by the microchannel structure of the present invention. Examples thereof include a medium in which a dispersing agent for producing polyvinyl alcohol gels is dissolved in an appropriate solvent. Like the dispersed phase, the continuous phase is not particularly limited as long as it can be supplied via the channels in the microchannel structure and, furthermore, the component thereof is not particularly limited either as long as it can form fine particles. In addition, the continuous phase may be a slurry material where solid such as fine powders are mixed in the continuous phase, a laminar flow in which the continuous phase is formed from a plurality of fluids, or a mixed fluid or a suspension (emulsion) formed from a plurality of fluids. In terms of the composition of the produced fine particles the outermost layer of the continuous phase will be an aqueous phase when the outermost layer of fine particles is an organic phase and the outermost layer of the continuous phase will be an organic phase when the outermost layer of fine particles is an aqueous phase.

Furthermore, in order to produce fine particles, the dispersed phase and continuous phase preferably do not mix substantially or are incompatible. For example, when an aqueous phase is used as the dispersed phase, an organic phase such as butyl acetate which does not dissolve in water substantially will be used as the continuous phase, and vice versa when an aqueous phase is used as the continuous phase.

Examples of the application of fine particles of the present invention include filling agents of columns for high performance liquid chromatography, zirconia beads for griding or catalyst supports and separate agents, catalysts such as zeolite particles, adhesives such as sealing/locking agents, insulating particles of metal particles, pressure measuring films, carbonless (pressure sensitive) copying papers, toner, thermal expansion agent; heating media, light control glass, gap agent (spacers), thermochromics (temperature sensitive liquid crystals and temperature sensitive dyes), capsules for magnetophoresis, agricultural chemicals, artificial diets, artificial seeds, air freshners, massage creams, lipsticks, capsules for vitamins, activated carbon, enzyme-containing capsules, and microcapsules and gels for DDS (drug delivery system) or the like.

In addition, in the microchannel structure of the present invention, it is preferably configured so that a plurality of branch channels for dispersed phase introduction and fine-particle formation channel join at an arbitrary eagle. Moreover, although these pluralities of branch channels for dispersed phase introduction may be parallel to one another or not, the angles at which the branch channels for dispersed phase introduction and fine-particle formation channel join are preferably all equal. Note that the phrase "arbitrary angle" refers to a "predetermined angle", which is determined at a stage where the microchannel structure is designed and which is based on the setting of a targeted particle diameter of fine particles and the amount of supply of the dispersed phase and continuous phase. Furthermore, when the plurality of branch channels for dispersed phase introduction are all formed from the microchannels which are linear and are parallel to one another, it is preferably configured so that the branch channels for dispersed phase introduction and fine-particle formation channel join at an arbitrary angle. By making a microchannel structure in which a plurality of branch channels for dispersed phase introduction are formed in parallel, fine particles can be produced at all the joining sections of the branch channels for dispersed phase introduction and fine-particle formation channel, and thus the production of fine particles in a large amount will be possible using one set of microchannel structures. For example, the microchannel structure of the present invention having 20 branch channels for dispersed phase introduction would have a capacity to produce 20 times as many fine particles per unit time as those produced by the microchannel structure having 1 branch channel for dispersed phase introduction. Needless to say, it is necessary to supply enough amount of the dispersed phase and continuous phase to meet the amount of fine particle production in this case.

Additionally, the fine-particle production method of the present invention produces fine particles by introducing the aforementioned dispersed phase and continuous phase to the microchannel structure of the present invention and by shearing the dispersed phase with the continuous phase at the joining section of the branch channel for dispersed-phase introduction and fine-particle formation channel. It is preferably configured so that the branch channel for dispersed-phase introduction and fine-particle formation channel join at an arbitrary angle. This is because it is possible to control the particle diameter of the produced fine particles by changing the angle of the joining section where the branch channel for dispersed-phase introduction joins the fine-particle formation channel.

Figure 21:
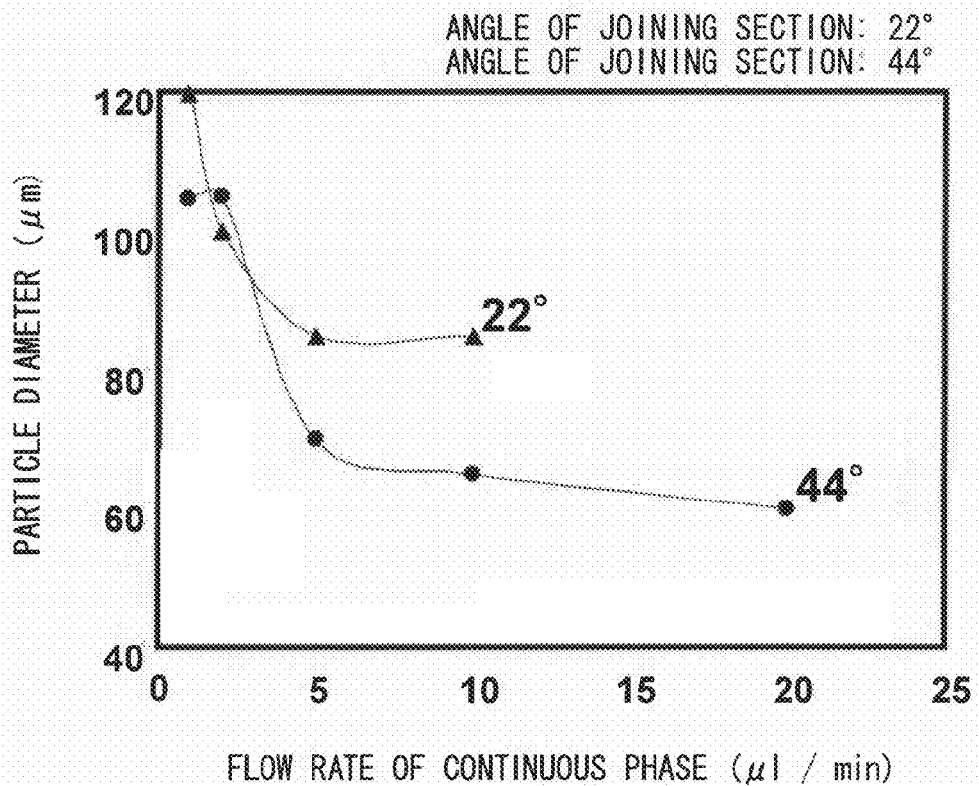
FIG. 21 is a diagram showing a relationship between to flow rate of continuous phase and particle diameter of the produced fine particles when the angles at the joining section of the dispersed-phase introduction channel and continuous-phase introduction channel are 22° and 44°.

FIG. 21 shows relationships between the flow rate of continuous phase and particle diameter of the produced fine particles when the angles between the branch channel for dispersed-phase introduction and fine-particle formation channel are 22° and 44° as examples. The horizontal axis shows the flow rate of continuous phase and the vertical axis shows particle diameter of the produced fine particles. As shown in FIG. 21, when the flow rate of continuous phase is low at 5 μl/min or less, particle diameter changes greatly. On the other hand, when the flow rate of continuous phase is 7 μl/min or more, particle diameter does not change greatly even if the flow role of continuous phase changes. In the example of FIG. 21, the particle diameter is about 85 μm when the angle is 22° and the particle diameter is about 65 μm when the angle is 44°, and thus it is apparent that the particle diameters of fine particles can be changed by the angle between the branch channel for dispersed-phase introduction and fine-particle formation channel. Accordingly, by setting the flow rate of the continuous phase to a condition in which the particle diameter does not change greatly and by changing the angle between the branch channel for dispersed-phase introduction and fine-particle formation channel, it is possible to control the particle diameter of the produced fine particles. Compared to the conventional case where the flow rates of the dispersed phase and continuous phase are changed to control the particle diameter of fine particles, the above process makes it easier to control the particle diameter of fine particles and is suited for the industrial, large scale production of fine particles. In other words, this means that the particle diameter of the produced fine particles is not greatly affected even when the flow rates of the dispersed phase and continuous phase somewhat change. Due to such a procedure, it is possible to produce fine particles having uniform particle diameters stably and the industrial, large scale production of fine particles is also possible. As for the setting of the angle of the joining section, it may appropriately be determined depending on the targeted particle diameter of fine parties.

In addition, as for the arrangement of the branch channel for dispersed-phase introduction, it is not particularly limited as long as it communicates with the fine-particle formation channel at a position which is different from those of the continuous-phase introduction inlet and discharge outlet. FIG. 4 shows this point more specifically; i.e. in the microchannel structure in which n branch channels for dispersed-phase introduction (i.e. from $Y_1$, which is the closest branch channel for dispersed-phase introduction to the dispersed-phase introduction inlet, to $Y_n$, which is the furthest branch channel for dispersed-phase introduction from the dispersed-phase introduction inlet) communicate from the dispersed-phase introduction channel to the fine-particle formation channels, when the position of the dispersed-phase introduction inlet is $X_0$, the position where $Y_1$ and the dispersed-phase introduction channel communicate is $X_1$, the length along the dispersed-phase introduction channel between $X_0$ and $X_1$ is $a_1$, the position where $Y_n$, and the dispersed-phase introduction channel communicate is $X_n$, and the length along the dispersed-phase introduction channel between $X_{n-1}$ and $X_n$ is $a_n$, it is preferable that the lengths from $a_2$ to $a_n$ are all equal.

FIGS. 6 to 18 show schematic diagrams of several embodiments of the present invention. Note that the present invention is not limited to these embodiments and not to mention that they can be changed arbitrarily so as not to fall beyond the scope of the present invention.

Figure 6:
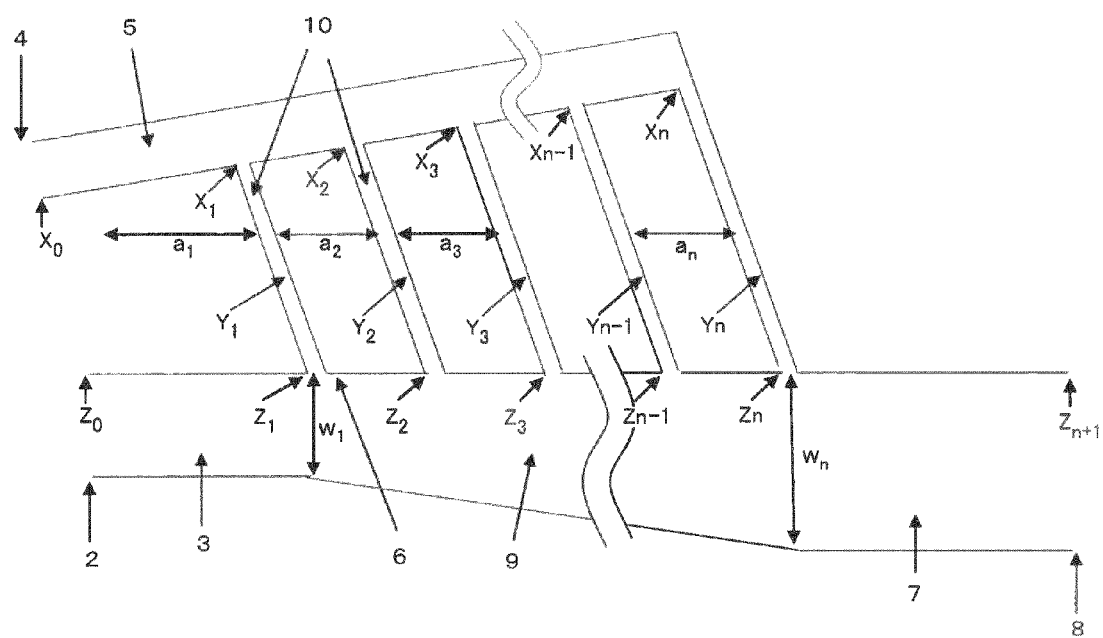
FIG. 6 is a schematic diagram showing one embodiment of the microchannel structure of the present invention.

FIG. 6 is an example where the cross sectional area of the fine-particle formation channel (9) gradually increases from the communication position hereof with the continuous-phase introduction channel (3) to the communication position thereof with the discharge channel (7), and also where the lengths of a plurality of branch channels for dispersed-phase introduction (10) gradually increase as the communication position of the branch channel for dispersed-phase introduction with the dispersed-phase introduction channel departs from the dispersed-phase introduction inlet.

In this case, the cross sectional area of the fine-particle formation channel (9) near the continuous-phase introduction channel is about 5000 to 10000 $\mu m^2$ and the cross sectional area of the fine-particle formation channel near the discharge channel is about 9000 to 20000 $\mu m^2$. In addition, the length of the branch channel for dispersed-phase introduction (10), which is at a position closest to the dispersed-phase introduction inlet, is about 3 to 4 mm and the length of the branch channel for dispersed-phase introduction, which is at a position furthest from the dispersed-phase introduction inlet, is about 3 to 6 mm.

As described so far, when the microchannel structure shown above is used, it is possible to tribute the continuous phase uniformly to a plurality of branch channels for dispersed-phase introduction, and thus the production of fine particles having an extremely uniform particle diameter is possible in all the microchannels with the same conditions.

To describe this point even further in detail using FIG. 4 as an example, the pressure gradually increases in the fine-particle formation channel from the communication position with the continuous-phase introduction channel to the communication position with the discharge channel, and thus, it is easier for the continuous phase to flow back to the branch channel for dispersed-phase introduction as it gets closer the communication position with the continuous-phase introduction channel. On the other hand, in the branch channel for dispersed-phase introduction, the pressure is small and thus dispersed-phase will be easier to flow as the communication position between the branch channel for dispersed-phase introduction and dispersed-phase introduction channel departs further from the dispersed-phase introduction inlet.

Accordingly, as shown in FIG. 6, it is configured so that the cross sectional area of the fine-particle formation channel gradually increases from the communication position thereof with the continuous-phase introduction channel to the communication position thereof with the discharge channel, and also that the lengths of a plurality of branch channels for dispersed-phase introduction gradually increase as the communication position of the branch channel for dispersed-phase introduction with the dispersed-phase introduction channel departs from the dispersed-phase introduction inlet. With such a configuration, the pressure at each branch channel for dispersed-phase introduction is equal and the pressure at each joining section with the branch channel for dispersed-phase introduction in the fine-particle formation channel is also equal, and thus it is possible to distribute the continuous phase uniformly to a plurality of branch channels for dispersed-phase introduction. As a result, it is possible to produce fine particles having an extremely uniform particle diameter in all the microchannels with the same conditions.

In addition, the microchannel structural body of the present invention may be a microchannel structural body where two or more microchannel structures which are formed from the aforementioned dispersed-phase introduction channel continuous-phase introduction channel, fine-particle formation channel, discharge channel, and branch channel for dispersed-phase introduction, are formed on a substrate, or may be a microchannel structural body in which plural sets of the dispersed-phase introduction channels constituting microchannels are arranged at an equal interval. For example, in the case of a circular microchannel-substrate, by arranging one unit of the microchannel structure, which is formed from the dispersed-phase introduction channel, continuous-phase introduction channel, fine-particle formation channel, discharge channel, and branch channel for dispersed-phase introduction, on the circular microchannel-substrate radially along the circumference thereof at an equal interval, it is possible to efficiently integrate numerous microchannels 2-dimensionally. By arranging one unit of the microchannel structure an equal interval as such, the dispersed phase and continuous phase can be uniformly supplied to each microchannel.

Figure 7:
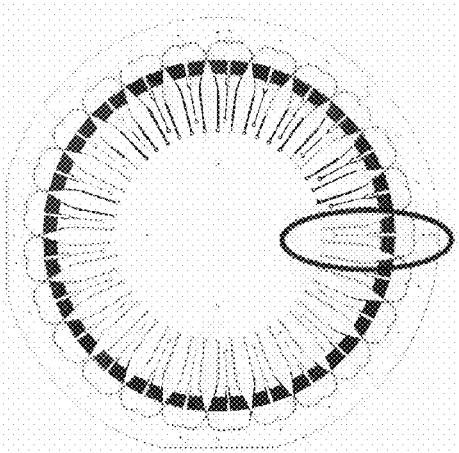
FIG. 7 is a schematic diagram in which the microchannel structures of FIG. 6 are arranged radially to integrate in the circumferential direction of a circular substrate.
Figure 8:
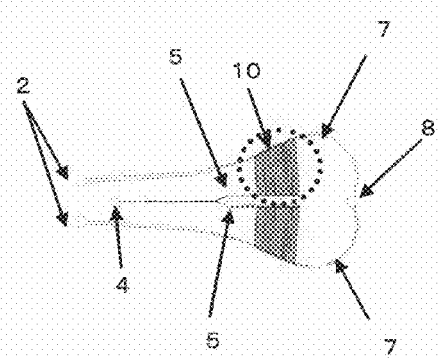
FIG. 8 is an enlarged view of 1 unit of the microchannel structure shown in FIG. 7.
Figure 9:
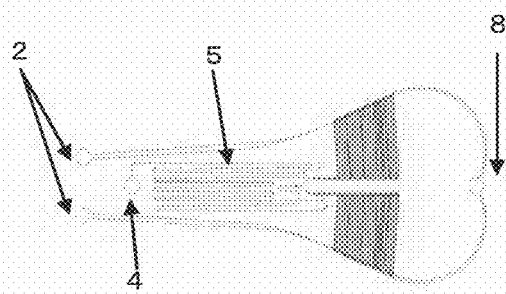
FIG. 9 is a schematic diagram showing an example where the length of the brunch channel for dispersed-phase introduction is increased in order to increase the power loss in the dispersed-phase introduction channel shown in FIG. 6.
Figure 10:
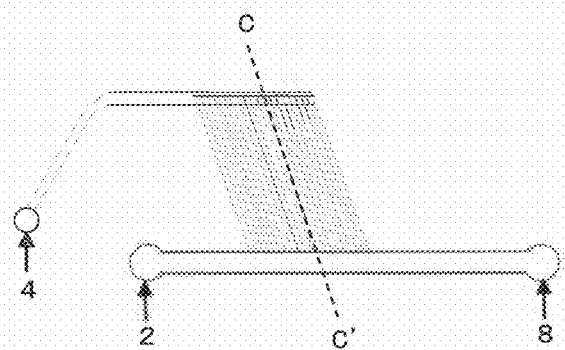
FIG. 10 is a schematic diagram showing an example where all the dispersed-phase introduction channel, continuous-phase introduction channel fine-particle formation channel, discharge channel, and branch channels for dispersed-phase introduction channel constituted on one substrate.

FIG. 7 shows one example in which a plurality of microchannel structures are integrated. By making the microstructure formed from the dispersed-phase introduction channel, continuous-phase introduction channel, fine-particle formation channel, discharge channel, and 40 branch channels for dispersed-phase introduction as one unit, 50 units of the microchannel structures are arranged radially on a 5-inch substrate. Since 2000 joining sections between the dispersed phase and continuous phase are made by this configuration, the simultaneous production of 2000 fine particles will be possible on one substrate. Note that in order to reduce the number of the dispersed-phase introduction inlets and discharge outlets, two dispersed-phase introduction channels (5) are made to communicate via one dispersed-phase introduction inlet (4) and two discharge channels (7) communicate with one discharge outlet (8) by every two microchannels adjacent to each other as shown in FIG. 8. It should also be noted that in the above microchannel structure, the length of the dispersed-phase introduction channel (5) may be increased as shown in FIG. 9. In other words, by increasing the pressure in the dispersed-phase introduction channel, it will be possible to supply the dispersed phase more uniformly to 1 unit of the abovementioned microchannel structure which will result in a preferable embodiment.

To describe this point even further in detail using the microchannel structure in FIG. 4 as an example, when toluene (viscosity: about 0.59 cp) and a 4% aqueous solution of polyvinyl alcohol (viscosity: about 40 cp) are supplied as the dispersed phase and continuous phase respectively, the pressure in the dispersed-phase introduction channel will become low (i.e., about $\frac{1}{60}$ to $\frac{1}{70}$ of that in the continuous-phase introduction channel) since the viscosity of toluene is lower than that of the 4% solution of polyvinyl alcohol (i.e., about $\frac{1}{60}$ to $\frac{1}{70}$ of that of the 4% aqueous solution of polyvinyl alcohol). For this reason, in the case where microchannel structures are integrated on one substrate as in FIG. 7, it is difficult to supply the dispersed phase uniformly to each microchannel structure when the pressure fluctuation occurs at each unit thereof. Accordingly, by increasing the length of the dispersed-phase introduction channel (5) as shown in FIG. 9 to increase the pressure in the dispersed-phase introduction channel, fluctuations of the pressure in each branch channel for dispersed-phase introduction is relatively small, and thus pressure fluctuations in one unit of microchannel structure is negligible. In other words, it is possible to supply the dispersed phase to each microchannel structure more uniformly. In this case, the length of the dispersed-phase introduction channel may be adjusted so that the pressure of the dispersed phase is equal to or somewhat higher than that of the continuous phase at the joining section between the branch channel for dispersed-phase introduction and droplet formation channel. Note that the pressure in the dispersed-phase introduction channel may be adjusted by changing, not only the length of the dispersed-phase introduction channel but also the depth thereof, or the length and/or depth of the branch channel for dispersed-phase introduction. of microchannel structure is negligible. In other words, it is possible to supply the dispersed phase to each microchannel structure more uniformly. In this case, the length of the dispersed-phase introduction channel may be adjusted so that the pressure loss of the dispersed phase is equal to or somewhat higher than that of the continuous phase at the joining section between the branch channel for dispersed-phase introduction and droplet formation channel. Note that the pressure=loss in the dispersed-phase introduction channel may be adjusted by changing, not only the length of the dispersed-phase introduction channel but also the depth thereof, or the length and/or depth of the branch channel for dispersed-phase introduction.

A substrate of microchannel structural body used in the present invention (hereinafter may be referred to as a microchannel substrate) refers to a substrate having a channel or a microchannel, and through holes which are equivalent to the dispersed-phase introduction inlet, continuous-phase introduction inlet, and discharge outlet. In addition, the microchannel structural body used in the present invention includes one in which a cover body which functions as a lid for channels and microchannels is integrated with the microchannel substrate and one in which two or more microchannel substrates are laminated to integrate and the cover body is mounted on the uppermost substrate where channels and microchannels are farmed. Note that the cover body may also have through holes equivalent to the dispersed-phase introduction inlet, continuous-phase introduction inlet, and discharge outlet. The materials for the substrate, in which microchannels are formed, and for the cover body, in which the formation/processing of microchannels and through holes is possible and having excellent chemical resistance and appropriate rigidity are preferable. For example, the materials may be glass, quartz, ceramics, silicon, metals, resins, or the like. Although the sizes and shapes of the microchannel substrate and cover body are not particularly limited, the thickness thereof is preferably a few millimeters or less.

As for the processing of channels and microchannels formed on a microchannel substrate, an appropriate processing method may be selected depending on the material of the microchannel substrate. For example, channels and microchannels can be made by directly processing the substrate material such as glass, quartz, ceramics, silicon, metals, and resins, due to mechanical processing, lass processing, etching, or the like. Additionally, when the substrate material is ceramic or resin, it is also possible to make channels and microchannels by using a mold which has a channel shape and is made of metal or the like.

The small holes arranged in the cover body communicate the microchannel with the outside of the microchannel structural body and when they are used as an introduction inlet for fluids or as a discharge outlet, the diameter thereof is preferably about a few millimeters. The processing of the small holes in the cover body can be done by various means such as chemical means, mechanical means, laser radiation and ion etching.

In addition, in the microchannel structural body of the present invention, two or more microchannel substrates or a microchannel substrate and a cover body can be laminated to integrate by means of joining due to a heat treatment, adhesion using adhesives such as a photosetting resin and thermowetting resin, or the like.

Additionally, due to the cover body, it is possible to introduce fluids from the outside of the microchannel structural body to the microchannel and then to discharge the fluids back to the outside of the microchannel strut body, and thus it is possible for fluids to pass through the microchannel stably even when the amount thereof is small. The supply of fluids may be done using a general solution sending pump and mechanical means such as micropumps and syringe pumps can be used.

Figure 11:
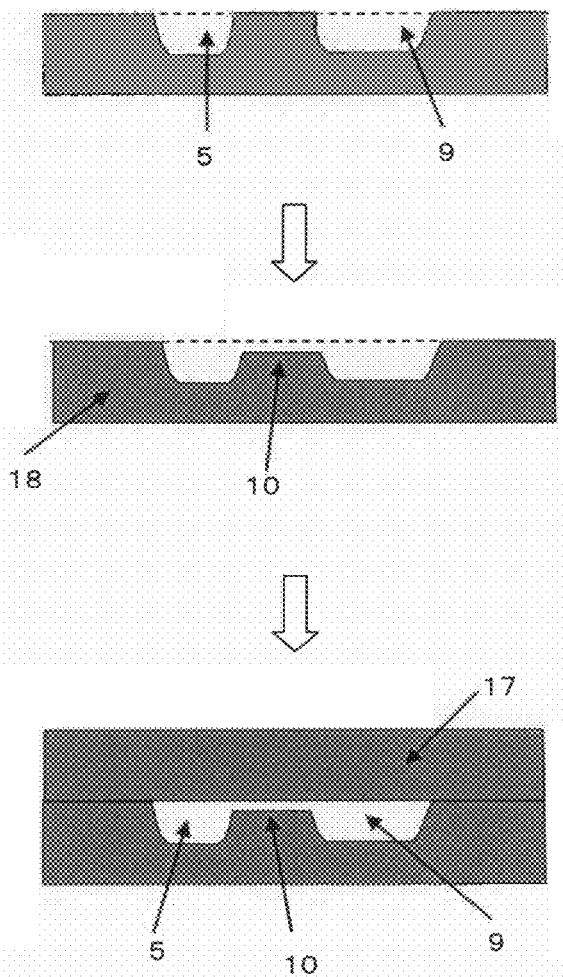
FIG. 11 is a diagram showing a flow in which all the dispersed-phase introduction channel, continuous-phase introduction channel, fine-particle formation channel, discharge channel, and branch channels for dispersed-phase introduction are constituted on one substrate.

In addition, in the microchannel structural body of the present invention, all of the dispersed-phase introduction channel continuous-phase introduction channel, fine-particle formation channel, discharge channel, and branch channel for dispersed-phase introduction may be formed on one substrate as shown in FIG. 11 while having the abovementioned structure and performance. By configuring as such, all channels and microchannels can be formed on one sure, and thus the number of microchannel substrates constituting the microchannel structural body can be reduced. Accordingly, microchannel structural bodies can be made more inexpensively.

Figure 12:
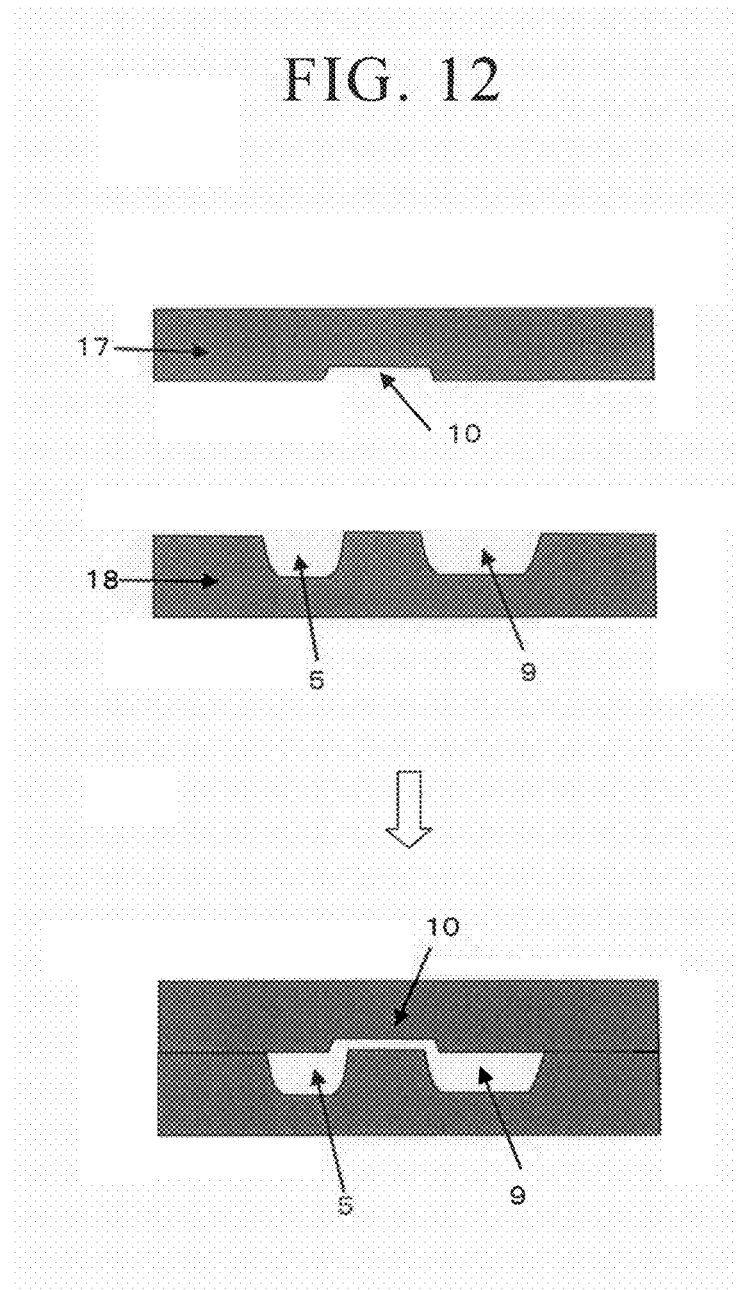
FIG. 12 is a diagram showing a flow in which the dispersed-phase introduction channel, continuous-phase introduction channel, fine-particle formation channel discharge channel, and branch channels for dispersed-phase introduction are constituted on at least two or more substrates.
Figure 13:
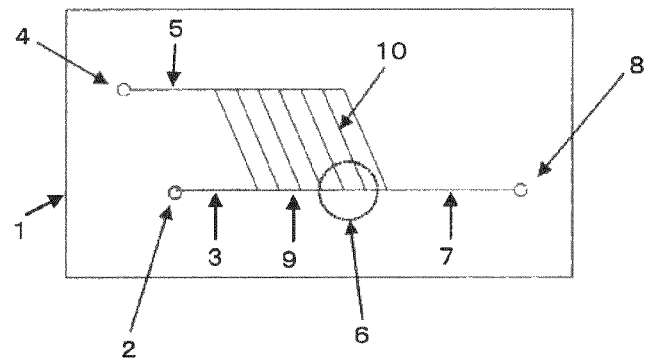
FIG. 13 is a schematic diagram showing one embodiment of the microchannel structural body in the present invention.

Additionally, as shown in FIG. 12, the dispersed-phase introduction channel, continuous-phase introduction channel, fine-particle formation channel, discharge channel, and branch channel for dispersed-phase introduction may be formed dispersedly on two or more substrates. For example, when forming all the channels on one substrate as in FIG. 11 and when the depth of each channel is different, it is necessary to subject one microchannel substrate to a plurality of processing conditions in order to process channels. When processing a different channel with a different processing condition, processing steps will be complicated and cumbersome due to the additional processing steps such as a step to protect a channel which is already processed once. However, by processing the channels having the same depth on the same microchannel substrate and the channels having different depths on separate microchannel substrates, the processing condition of each microchannel substrate remains the same, and thus the processing steps can be more simplified.

Figure 16:
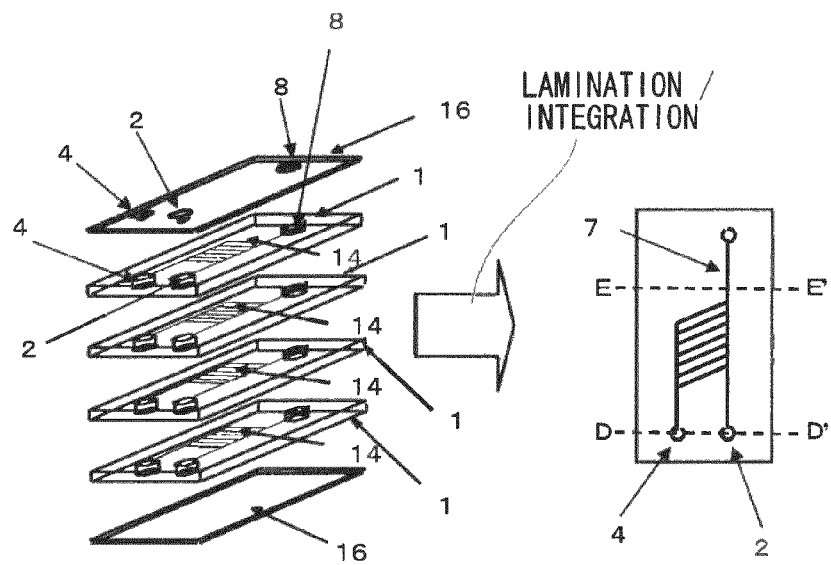
FIG. 16 is a schematic diagram showing an example where microchannel substrates are laminated.
Figure 17:
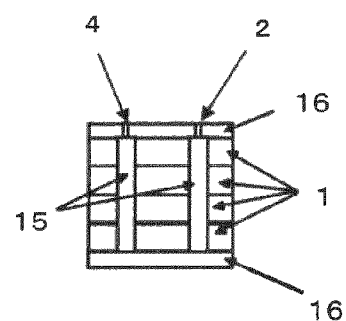
FIG. 17 is a cross sectional diagram along the line D-D' of FIG. 16.
Figure 18:
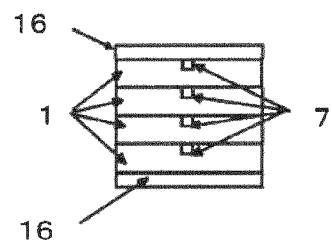
FIG. 18 is a cross sectional diagram along the line E-E' of FIG. 16.

In addition, the microchannel-structure laminated body of the present invention is a microchannel-structure laminated body where two or more of the above-mentioned microchannel structural bodies are laminated and it can be configured so that the dispersed-phase introduction inlet, continuous-phase introduction inlet, and discharge outlet in the microchannel structural body are formed by penetrating the microchannel substrate of the microchannel structural body. FIGS. 16 to 18 show examples where the aforementioned microchannel substrates (1) are laminated. The continuous-phase introduction inlet (2), dispersed-phase introduction inlet (4), and discharge outlet (8) are formed by penetrating their respective microchannel substrates. This embodiment is effective when laminating microchannel substrates and integrating numerous microchannels 3-dimensionally. With such a configuration, channels can be integrated not only 2-dimensionally but also 3-dimensionally and it is possible to produce fine panicles in a larger amount. Note that although FIGS. 16 to 18 show examples where all the channels are formed on one microchannel substrate, it is also possible to laminate microchannel structural bodies where channels are formed on a plurality of microchannel substrates.

Figure 14:
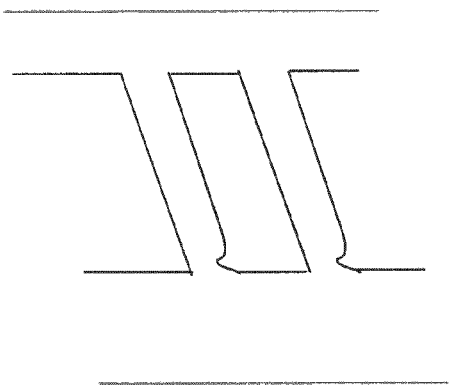
FIG. 14 is an enlarged view of the position 6 in FIG. 13 and is a schematic diagram showing one embodiment of the joining section in the present invention.
Figure 15:
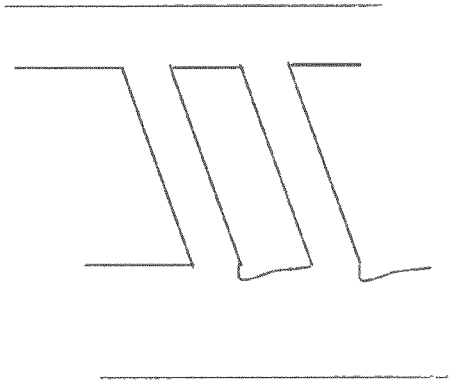
FIG. 15 is a schematic diagram showing another embodiment of the joining section in the present invention.

Additionally, in the joining section, at which the branch channel for dispersed-phase introduction and fine-particle formation channel join, or in the vicinity thereof in the microchannel structure, microchannel structural body, and microchannel-structure laminated body of the present invention, the width of the branch channel for dispersed-phase introduction may be partially reduced as shown in FIG. 14, or the width of the fine-particle formation channel may be partially reduced as shown in FIG. 15. By configuring as such, it will be easier to shear the dispersed phase by the continuous phase at the joining section where the branch channel for dispersed-phase introduction and fine-particle formation channel join, and thus is an embodiment in which uniform droplets are produced more easily.

According to the present invention, the following effects can be achieved.

By using a microchannel structure of the present invention, fine particles can stably be produced with uniform sizes and in a large amount.

In addition, according to the present invention, it is possible to integrate numerous microchannels on one structural body and also to supply solutions uniformly to one unit of microchannel structure.

Additionally, according to the present invention, the integration of microchannel substrates is readily possible.

In addition, according to the preset invention, the number of substrates required for the lamination of microchannel substrates is less.

Additionally, according to the present invention, the reduction in pressure will be possible in the channels other than the fine-particle formation channel which has particularly small cross sectional area and is most appropriate for the fine-particle formation.

In addition, according to the present invention, the preparations of the microchannel structure, microchannel structural body, and microchannel-structure laminated body becomes easy.

Additionally, according to the present invention, it is possible to produce fine particles having a uniform size more reliably and stably and in a large amount.

In addition, according to the present invention, it is possible to control the particle diameter of the produced fine particles more easily and also more stably.

EXAMPLE

The embodiment of the present invention will be described in detail below using Examples. Note that the present invention is not limited to these Examples and not to mention that they can be changed arbitrarily within a range which does not fall beyond the scope of the present invention.

Example 1

FIG. 4 shows a schematic diagram of the microchannel structure used in Example 1. As shown in FIG. 4, the microchannel structure used in the present Example had a dispersed-phase introduction channel (5) which communicated with a dispersed-phase introduction inlet (4), continuous-phase introduction channel (3) which communicated with a continuous-phase introduction inlet (2), discharge channel (7) which communicated with a discharge outlet (8), and particle formation channel (9), and in which one end of the particle formation channel (9) communicates with the continuous-phase introduction channel whereas the other end thereof communicated with the discharge channel. The dispersed-phase introduction channel communicated the fine-particle formation channel via 40 branch channels for dispersed phase introduction (10) which were arranged in parallel with the interval of 0.1 mm. The dispersed-phase introduction channel, continuous-phase introduction channel, discharge channel, particle formation channel, and branch channel for dispersed-phase introduction were formed as microchannels and their Bs (i.e. width/depth/length) were (95 μm/45 μm/9.45 mm), (333 μm/45 μm/11.8 mm), (275 μm/45 μm/11.2 mm), (195 μm/45 μm/3.92 mm), and (19 μm/7 μm/3.5 mm), respectively. In addition, they were formed so that the lengths of $a_1$, $b_1$, $c_1$, and all the lengths of $a_2$ to $a_n$, in FIG. 4 were 9.45 mm, 11.8 mm, 11.2 mm, and 0.1 mm, respectively. Note that the branch channel for dispersed-phase introduction and particle formation channel were formed so that they joined to form an angle of 70°.

Additionally, as shown in FIG. 12, a microchannel substrate, in which only the branch channel for dispersed-phase introduction was formed on one substrate, and microchannel substrate, in which the dispersed-phase introduction cannel, continuous-phase introduction channel, discharge channel, and particle formation channel were formed on one substrate, were prepared as a lid substrate (17) and bottom substrate (18) respectively, and a microchannel structure was formed by joining the lid substrate and bottom substrate together. A piece of Pyrex (registered trademark; 70 mm×30 mm×1 mm) substrate was used for both the lid substrate and bottom substrate.

In addition, the respective microchannels formed on the lid substrate and bottom substrate were formed by general photolithography and wet etching processes, and the lid substrate and bottom substrate were joined using a general heat seal process. Moreover, small holes having a diameter of 0.6 mm were provided in advance on the lid substrate at positions which corresponded to the continuous-phase introduction inlet (2), dispersed-phase introduction inlet (4), and discharge outlet (8) using mechanical processing means. Note that the preparation method and substrate material of the present microchannel structure are not limited to the above.

Additionally, microsyringe pumps for supplying the continuous phase and dispersed phase via Teflon tubes were connected to the continuous-phase introduction inlet and dispersed-phase introduction inlet of the microchannel structure and the continuous phase and dispersed phase were supplied to the microchannel structure. Moreover, a Teflon tube was also connected to the discharge outlet and the slurry containing the produced fine particles was discharged to recover. Note that toluene and 4% polyvinyl alcohol aqueous solution were used as the dispersed phase and continuous phase, respectively.

Figure 19:
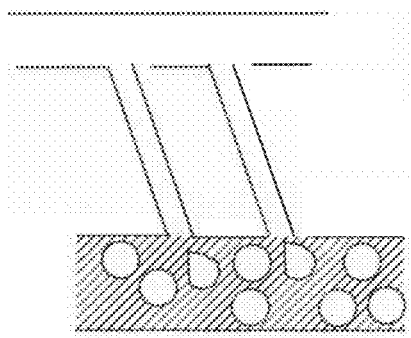
FIG. 19 is a schematic diagram showing an example in which fine particles are formed in the joining section where the dispersed phase and continuous phage merge, in Example 1.
Figure 20:
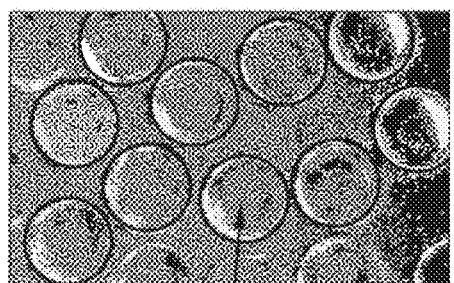
FIG. 20 is a diagram showing fine particles produced in Example 1.

When the dispersed phase and continuous phase were supplied to the present microchannel structure at supply rates of 8 μl/min and 12 μl/min respectively, the production of fine particles (13) as shown in FIGS. 19 and 20 was observed at the merging section of the microchannel structure where the dispersed phase and continuous phase join, under the condition where both supply rates were stable. When the produced fine particles (13) were observed as shown in FIG. 20, the average particle diameter of the fine particles was 32.2 μm and the CV value (%), which indicates the degree of variance of particle diameters, was 10.9% showing that the produced fine particles (13) were relatively uniform. The CV values are the values where the standard deviation of particle diameter is divided by the average particle diameter. Additionally, the production rate of the slurry, which was obtained by solution sending and which contained fine particles, was 20 μl/min. Compared to Comparative Example 1, in which the number of branch channel for dispersed-phase introduction was 1, Example 1 where 40 branch channels for dispersed-phase introduction were integrated had the production rate of the slurry containing fine particles which vas about 40 times higher. Accordingly, it was shown that by integrating the branch channels for dispersed-phase introduction, fine particles can be produced in a large amount which is proportional to the number of branch channels for dispersed-phase introduction.

Next, when both the dispersed phase and continuous phase were supplied at a supply rate of 8 μl/min, the average particle diameter of the produced fine particles was 34.5 μm and the CV value (%), which indicates the degree of variance of particle diameters, was 12.3% showing that the produced fine particles were relatively uniform. In other words, it was possible to suppress the fluctuation of the particle diameter down to an extremely low level of about 7% even when the supply rate of the continuous phase fluctuated by about 50% in the present Example 1, and fine particles could be produced stably with a particle diameter, which was more or less within an acceptable range of the target diameter (the acceptable range assumed in the present Example was between 27 to 37 µm), even when the supply rate of the continuous phase fluctuated greatly.

Example 2

FIG. 6 shows a schematic diagram of the microchannel structure used in Example 2. As shown in FIG. 6, the microchannel structure used in the present Example had a dispersed-phase introduction channel (5) which communicated with a dispersed-phase introduction inlet (4), continuous-phase introduction camel (3) which communicated with a continuous-phase introduction inlet (2), discharge channel (7) which communicated with a discharge outlet (8), and particle formation channel (9), and in which one end of the particle formation channel communicated with the continuous-phase introduction channel whereas the other end thereof communicated with the discharge channel. The dispersed-phase introduction channel communicated the particle formation channel via 40 branch channels for dispersed-phase introduction (10) which were arranged in parallel with the interval of 0.1 mm. The dispersed-phase introduction channel, continuous-phase introduction channel, and discharge channel were formed as microchannels and their sizes (i.e. width/depth/length) were (95 µm/45 µm/21.4 mm), (279 µm/45 µm/15.8 mm), and (250 µm/45 µm/9.9 mm). The particle formation channel was formed as microchannels with a depth and length of 45 µm and 3.92 mm respectively, and the width thereof was made so that it gradually increased from the communication position thereof with the continuous-phase introduction channel (153 µm) to the communication position thereof with the discharge channel (250 µm). The branch channel for dispersed-phase introduction was formed as microchannels with a width and depth of 19 µm and 7 µm respectively, and the length thereof was made so that it gradually increased from 3.5 mm to 5.18 mm as the communication position of the branch channel for dispersed-phase introduction and dispersed-phase introduction channel departs from the dispersed-phase introduction inlet. Note that the branch channel for dispersed-phase introduction and particle formation channel were formed so that they joined to form an angle of 70°.

Additionally, as shown in FIG. 12, a microchannel substrate, in which only the branch channel for dispersed-phase introduction was formed on one substrate, and microchannel substrate, in which the dispersed-phase introduction channel, continuous-phase introduction channel, discharge channel, and particle formation channel were formed on one substrate, were prepared as a lid substrate (17) and bottom substrate (18) respectively, and a microchannel structural body was formed by joining the lid substrate and bottom substrate together. A piece of Pyrex (registered trademark; 70 mm×30 mm×1 mm) substrate was used for both the lid substrate and bottom substrate.

In addition, the respective microchannels formed on the lid substrate and bottom substrate were formed by general photolithography and wet etching processes, and the lid substrate and bottom substrate were joined using a general heat seal process. Moreover, small holes having a diameter of 0.6 mm were provided in advance on the lid substrate at positions which corresponded to the continuous-phase introduction inlet (2), dispersed-phase introduction inlet (4), and discharge outlet (8) using mechanical processing means. Note that the preparation method and substrate material of the present microchannel structure are not limbed to the above.

Additionally, microsyringe pumps for supplying the continuous phase and dispersed phase via Teflon tubes were connected to the continuous-phase introduction inlet and dispersed-phase introduction inlet of the microchannel structure and the continuous phase and dispersed phase were supplied to the microchannel structure. Moreover, a Teflon tube was also connected to the discharge outlet and the slurry containing the produced fine particles was discharged to recover through this Teflon tube. Note that toluene and 4% polyvinyl alcohol aqueous solution were used as the dispersed phase and continuous phase, respectively.

When the dispersed phase and continuous phase were supplied to the preset microchannel structure at supply rates of 8 µl/min and 12 µl/min respectively, the production of fine particles was observed at the merging section, in which the dispersed phase and continuous phase of the microchannel structure join, under the condition where both supply rates were stable. When the produced fine particles were observed, the average particle diameter of the fine particles was 32.2 µm and the CV value (%), which indicates the degree of variance of particle diameters, was 8.8% showing that the produced fine particles were extremely uniform. Additionally, the production rate of the slurry, which was obtained by solution sending and which contained particles, was 20 µl/min. Compared to Comparative Example 1, in which the number of branch channel for dispersed-phase introduction was 1, Example 2 where 40 branch channels for dispersed-phase introduction were integrated had the production rate, of the slurry containing fine particles which was about 40 times higher. Accordingly, it was shown that by integrating the branch channels for dispersed-phase introduction, fine particles can be produced in a large amount which is proportional to the number of branch channels for dispersed-phase introductions.

Next, when both the dispersed phase and continuous phase were supplied at a supply rate of 8 µl/min, the average particle diameter of the produced fine particles was 33.1 µl/m and the CV value (%), which indicates the degree of variance of particle diameters, was 9.9% showing that the produced fine particles were extremely uniform. In other words, it was possible to suppress the fluctuation of the particle diameter down to an extremely low level of about 3% even when the supply rate of the continuous phase fluctuated by about 30% in the present Example 2, and fine particles could be produced stably with a particle diameter, which was more or less within an acceptable range of the target diameter (the acceptable range assumed in the present Example was between 27 to 37 µm), even when the supply rate of the continuous phase fluctuated greatly.

Example 3

FIG. 7 shows a schematic diagram of the microchannel substrate used in Example 3. The microchannel substrate shown in FIG. 7 was prepared as a microchannel substrate where the microchannel structure used in Example 2 were integrated on one circular substrate. In other words, 50 units of the microchannel structure, 1 unit of which was formed from the dispersed-phase introduction channel, continuous-phase introduction channel fine-particle formation channel, discharge channel, and 40 branch channels for dispersed-phase introduction, were arranged in circles on a Pyrex (registered trademark) substrate having a diameter and thickness of 5 inches and 1.2 mm respectively, with an equal interval. The continuous-phase introduction inlet (2), dispersed-phase introduction inlet (4), and discharge outlet (8) in the microchannel structure were arranged so that their positions were on concentric circles having a radius of 30 mm, 35 mm, and 55 mm, respectively. With such a configuration, it was possible to prepare a microchannel substrate having 2000 joining sections of the dispersed phase and continuous phase on one substrate and in which fine particles could be produced simultaneously at the aforementioned 2000 joining sections. Note that in order to reduce the number of the dispersed-phase introduction inlet and discharge outlet, 2 dispersed-phase introduction channels (5) and 2 discharge channels (7) were communicated by one dispersed-phase introduction inlet (4) and one discharge outlet respectively, at every two units of microchannel structures which were adjacent to each other as shown in FIG. 8. In addition, the microchannel substrate having this microchannel structure was prepared by general photolithography and wet etching processes as in Example 1. The through holes of the continuous-phase introduction inlet, dispersed-phase introduction inlet, and discharge outlet in the microchannel structure were formed as the through holes having a diameter of 1 mm by mechanical processing.

Figure 23:
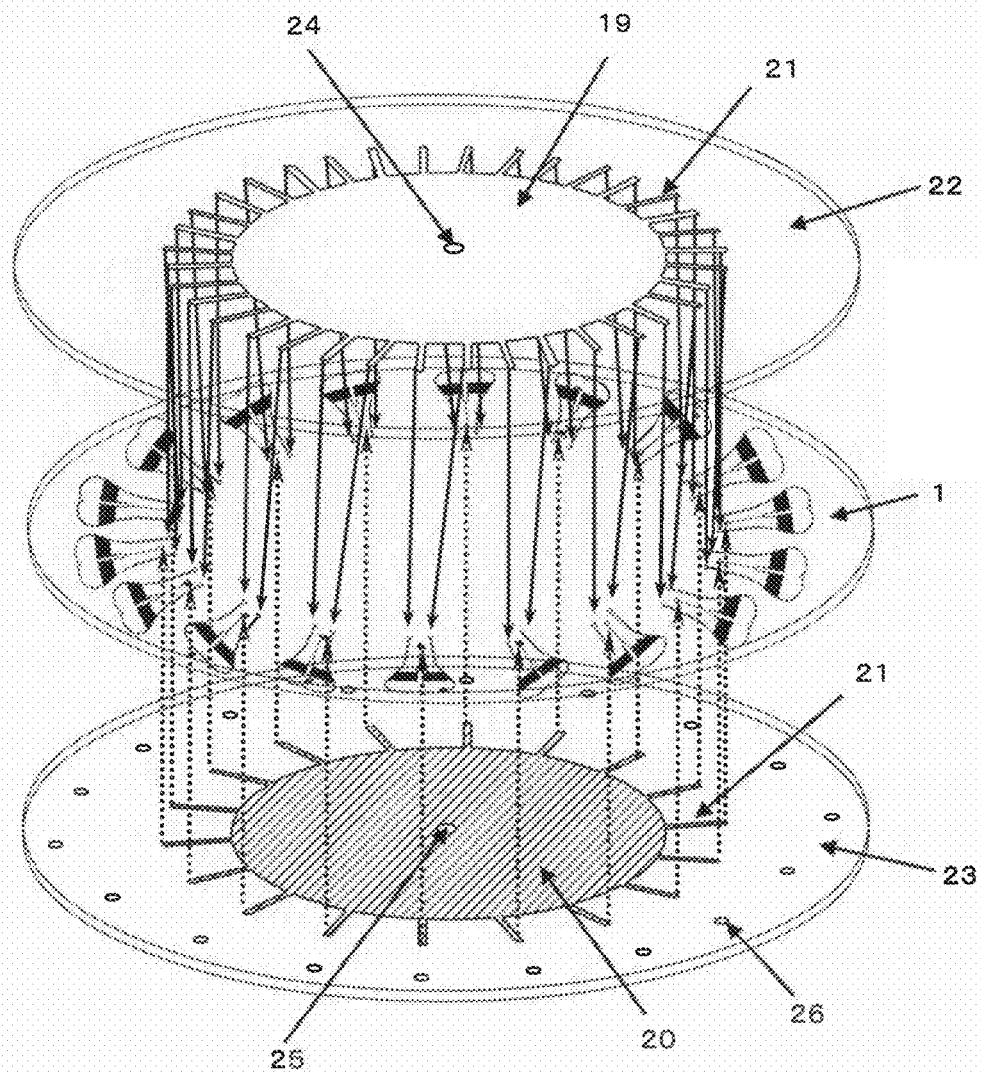
FIG. 23 is a schematic diagram showing a microchannel structural body in Example 3.

FIG. 23 shows a schematic diagram of the microchannel structural body used in Example 3. As shown in FIG. 23, the microchannel structural body was prepared so that a channel substrate for supplying continuous phase (22) having a reservoir (19) and supplying channel (21) which supplied continuous phase was joined on the top face of the aforementioned microchannel substrate (1), and a channel substrate for supplying dispersed phase (23) having a reservoir (20) and supplying channel (21) which supplied disposed phase was joined on the bottom face of the aforementioned microchannel substrate (1). Like the microchannel substrate, Pyrex (registered trademark) substrate having a diameter and thickness of 5 inches and 1.2 mm respectively, was used to prepare the channel substrate for supplying continuous phase and channel substrate for supplying dispersed phase which were joined on the top and bottom faces of the microchannel substrate. In addition, the reservoirs and supply channels formed on the channel substrate for supplying continuous phase and channel substrate for supplying dispersed phase were formed by general photolithography and wet etching processes. The joining of the microchannel substrate with the channel substrate for supplying continuous phase and channel substrate for supplying dispersed phase was carried out by a general heat seal process. Note that the trough hole (24) of the reservoir of the channel substrate for supplying continuous phase, through hole (25) of the reservoir of the channel substrate for supplying dispersed phase, and through holes of fluid discharge outlet (26) were formed as the through holes having a diameter of 1 mm by mechanical prong. Additionally, the shape of the reservoirs of the channel substrate for supplying continuous phase and channel substrate for supplying dispersed phase was a cylinder having a diameter and depth of 30 mm and 300 μm, respectively. Moreover, linear supply channels were formed radially from the circumferences of the reservoirs. The supply channels from the reservoir of the structural body for supplying continuous phase had a length width, and depth of 15 mm, 1 mm, and 300 μm respectively, and 50 of them were formed at an equal interval. The supply channels from the reservoir of the structural body for supplying dispersed phase had a length, width, and depth of 20 mm, 1 mm, and 300 μm respectively, and 25 of them were formed at an equal interval. 25 of the through holes of fluid discharge outlet (26) on the channel substrate for supplying dispersed phase were arranged at positions on a concentric circle having a radius of 55 mm so as to correspond with the positions of discharge outlet (8) of the microchannel substrate (1).

By configuring such a microstructural body, the continuous-phase introduction inlets and dispersed-phase introduction inlets in respective microchannel structures formed on microchannel substrates could communicate via the linear supply channels arranged radially from the reservoirs which were provided on the channel substrate for supplying continuous phase and channel substrate for supplying diapers phase which were joined on the top and bottom faces of the microchannel substrate. Additionally, solution sending pumps for supplying the continuous phase and dispersed phase via Teflon tubes were connected to the through hole (24) of the reservoir on the channel substrate for supplying continuous phase and to the through hole (25) of the reservoir on the channel substrate for supplying dispersed phase of the microchannel so body, and the continuous phase and dispersed phase were supplied to the microchannel structural body. Moreover, a Teflon tube was also connected to each of 25 fluid discharge outlets formed on the channel substrate for supplying dispersed phase and the slurry containing the produced fine particles was discharged to recover through this Teflon tube. Note that toluene and 4% polyvinyl alcohol aqueous solution were used as the dispersed phase and continuous phase, respectively.

When the dispersed phase and continuous phase were supplied to the present microchannel structural body at supply rates of 0.4 ml/min and 0.6 ml/min respectively, the production of fine particles was observed at the merging section, in which the dispersed phase and continuouse phase in the microchannel structural body join under the condition where both supply rates were stable. When the produced fine particles were observed, the average particle diameter of the fine particles was 32.5 μm and the CV value (%), which indicates the degree of variance of particle diameters, was 11.7% showing that the produced fine particles were relatively uniform. Additionally, the production rate of the slurry, which was obtained by solution sending and which contained fine particles, was 1 ml/min. Accordingly, Example 3 which uses a microchannel structural body, in which 50 microchannel structures of Example 2 were integrated, had the production rate of the slurry containing fine particles which was about 50 times higher compared to that of Example 2, and thus it was shown that by integrating microchannel structures, fine particles can be produced in a large amount which is proportional to the number of microchannel structures.

Next, when both the dispersed phase and continuous phase were supplied at a supply rate of 004 ml/min, the average particle diameter of the produced fine particles was 33.2 μm and the CV value (%), which indicates the degree of variance of particle diameters, was 9.8% showing that the produced fine particles were extremely uniform. In other words, it was possible to suppress the fluctuation of the particle diameter down to an extremely low level of about 2% even when the supply rate of the continuous phase fluctuated by about 30% in the present Example 3, and fine particles could be produced stably with a particle diameter, which was more or less within an acceptable range of the target diameter (the acceptable range assumed in the present Example was between 27 to 37 μm), even when the supply rate of the continuous phase fluctuated greatly.

Example 4

In the present Example 4, a microchannel-structure laminated body was made by laminating 5 microchannel substrates used in Example 3, joining the channel substrate for supplying continuous phase used in Example 3 onto the top face of the uppermost microchannel substrate, and joining the channel substrate for supplying dispersed phase used in Example 3 onto the bottom face of the lowermost microchannel substrate. Joining of microchannel substrate with the channel substrate for supplying continuous phase and with the channel substrate for supplying dispersed phase was carried out using a general heat seal process. With such a configuration, it was possible to prepare a microchannel-structure laminated body having 10000 joining sections of the dispersed phase and continuous phase per one unit of the laminated body and in which fine particles could be produced simultaneously at the aforementioned 10000 joining sections. Additionally, solution sending pumps for supplying the continuous phase and dispersed phase via Teflon tubes were connected to the through hole (24) of the reservoir on the channel substrate for supplying continuous phase and to the through hole (25) of the reservoir on the channel substrate for supplying dispersed phase of the microchannel-structure laminated body, and the continuous phase and dispersed phase were supplied to the microchannel-structure laminated body. Moreover, a Teflon tube was also connected to each of 25 fluid discharge outlets formed on the channel substrate for supplying dispersed phase and the slurry containing the produced fine particles was discharged to recover through this Teflon tube. Note that toluene and 4% polyvinyl alcohol aqueous solution were used as the dispersed phase and continuous phase, respectively.

When the dispersed phase and continuous phase were supplied to the present microchannel-structure laminated body at supply rates of 2 ml/min and 3 ml/min respectively, the production of fine particles was observed at the merging section, in which the dispersed phase and continuous phase in the microchannel-structure laminated body join, under the condition where both supply rates were stable. When the produced fine particles were observed, the average particle diameter of the fine particles was 34.3 μm and the CV value (%), which indicates the degree of variance of particle diameters, was 10.8% showing that the produced fine particles were relatively uniform. Additionally, the production rate of the slurry, which was obtained by solution sending and which contained fine particles, was 5 ml/min. Accordingly, Example 4 which uses a microchannel-structure laminated body, in which 5 microchannel substrates of Example 3 were laminated had the production rate of the slurry containing fine particles which was about 5 times higher compared to that of Example 3, and thus it was shown that by laminating microchannel substrates, fine particles could be produced in a large amount which was proportional to the number of microchannel substrates.

Next, when both the dispersed phase and continuous phase were supplied at a supply rate of 2 ml/min, the average particle diameter of the produced fine particles was 36.6 μm and the CV value (%), which indicates the degree of variance of particle diameters, was 9.4% showing that the produced fine particles were extremely uniform. In other words, it was possible to suppress the fluctuation of the particle diameter down to an extremely low level of about 6% even when the supply rate of the continuous phase fluctuated by about 300% in the present Example 4, and fine particles could be produced stably with a particle diameter, which was more or less within an acceptable range of the target diameter (the acceptable range assumed in the present Example was between 27 to 37 μm), even when the supply rate of the continuous phase fluctuated greatly.

Example 5

In the present Example 5, a microchannel-structure laminated body was made by laminating 20 microchannel substrates used in Example 3, joining the channel substrate for supplying continuous phase used in Example 3 onto the top face of the uppermost microchannel substrate, and joining the channel substrate for supplying dispersed phase used in Example 3 onto the bottom face of the lowermost microchannel substrate. Joining of microchannel substrate with the channel substrate for supplying continuous phase and with the channel substrate for supplying dispersed phase was earned out using a general heat seal process with such a configuration, it was possible to prepare a microchannel-structure laminate body having 40000 joining sections of the dispersed phase and continuous phase substantially per one unit of the laminated body and in which fine particles could be produced simultaneously at the aforementioned 40000 joining sections. Additionally, solution sending pumps for supplying the continuous phase and dispersed phase via Teflon tubes were connected to the through hole (24) of the reservoir on the channel substrate for supplying continuous phase and to the through hole (25) of the reservoir on the channel substrate for supplying dispersed phase of the microchannel-structure laminated body, and the continuous phase and dispersed phase were supplied to the microchannel-structure laminated body. Moreover, a Teflon tube was also connected to each of 25 fluid discharge outlets formed on the channel substrate for supplying dispersed phase and the slurry containing the produced fine particles was discharged to recover through this Teflon tube. Note that toluene and 4% polyvinyl alcohol aqueous solution were used as the dispersed phase and continuous phase, respectively.

When the dispersed phase and continuous phase were supplied to the present microchannel-structure laminated body at supply rates of 8 ml/min and 12 ml/min respectively, the production of fine particles was observed at the merging section, in which the dispersed phase and continuous phase in the microchannel-structure laminated body join, under the condition where both supply rates were stable. When the produced fine particles were observed, the average particle diameter of the fine particles was 34.3 μm and the CV value (%), which indicates the degree of variance of particle diameters, was 10.4% showing that the produced fine particles were relatively uniform. Additionally, the production rate of the slurry, which was obtained by solution sending and which contained fine particles, was 20 ml/min. Accordingly, Example 5 which uses a microchannel-structure laminated body, in which 20 microchannel substrates of Example 3 were laminated, had the production rate of the slurry containing fine particles which was about 20 times higher compared to that of Example 3, and thus it was shown that by laminating microchannel substrates fine particles could be produced in a large amount which was proportional to the number of microchannel substrates.

Next, when both the dispersed phase and continuous phase were supplied at a supply rate of 8 ml/min, the average particle diameter of the produced fine particles was 36.0 μm and the CV value (%), which indicates the degree of variance of particle diameters, was 9.8% showing that the produced fine particles were extremely uniform.

Example 6

FIG. 4 shows a schematic diagram of the microchannel structure used in Example 6. As shown in FIG. 4, the microchannel structure used in the present Example had a dispersed-phase introduction channel (5) which communicated with a dispersed-phase introduction inlet (4), continuous-phase introduction channel (3) which communicated with a continuous-phase introduction inlet (2), discharge channel (7) which communicated with a discharge outlet (8), and particle formation channel (9), and in which one end of the particle formation channel (9) communicated with the continuous-phase introduction channel whereas the other end thereof communicated with the discharge channel. The dispersed-phase introduction channel communicated the particle formation channel via 40 branch channels for dispersed-phase introduction (10) which were arranged in parallel with the interval of 0.1 mm. The dispersed-phase introduction channel, continuous-phase introduction channel, discharge channel, particle formation channel, and branch channel for dispersed-phase introduction were formed as microchannels and their sizes (i.e. width/depth/length) were (200 µm/140 µm 98 mm), (530 µm/140 µm/11.8 mm), (480 µm/140 µm/11.2 mm), (300 µm/140 µm/3.9 mm), and (41 µm/18 µm/3.5 mm), respectively. In addition, they were formed so that the lengths of $a_1$, $b_1$, $c_1$, and all the lengths of $a_2$ to $a_n$ in FIG. 4 were 9.5 mm, 11.8 mm, 11.2 mm, and 0.1 mm, respectively. Note that the branch channel for dispersed-phase introduction and particle formation channel were formed so that they joined to form an angle of 70°.

Additionally, as shown in FIG. 12, a microchannel substrate, in which only the branch channel for dispersed-phase introduction was formed on one substrate, and microchannel substrate, in which the dispersed-phase introduction channel, continuous-phase introduction channel, discharge channel, and particle formation channel were formed on one substrate, were prepared as a lid substrate (17) and bottom substrate (18) respectively, and a microchannel structure was formed by joining the lid substrate and bottom substrate together. A piece of Pyrex (registered trademark; 70 mm×30 mm×1 mm) substrate was used for both the lid substrate and bottom substrate.

In addition, the reeve microchannels formed on the lid substrate and bottom substrate were formed by general photolithography and wet etching processes, and the lid substrate and bottom substrate were joined using a general heat seal process. Moreover, small holes having a diameter of 0.6 mm were provided in advance on the lid substrate at positions which corresponded to the continuous-phase introduction inlet (2), dispersed-phase introduction inlet (4), and discharge outlet (8) using mechanical processing means. Note that the preparation method and substrate material of the present microchannel structure are not limited to the above.

The microchannel substrate where the abovementioned microchannel structures were integrated on one circular substrate was prepared. In other words, 50 units of the microchannel structure, 1 unit of which was formed from the dispersed-phase introduction channel, continuous-phase introduction channel, fine-particle formation channel, discharge channel, and 40 branch channels for dispersed-phase introduction, were arranged in circles on a Pyrex (registered trademark) substrate having a diameter and thickness of 5 inches and 1.2 mm respectively, with an equal interval. The continuous-phase introduction inlet (2), dispersed-phase introduction inlet (4), and discharge outlet (8) in the microchannel structure were arranged so that their positions were on concentric circles having a radius of 30 mm, 35 mm, and 55 mm, respectively. With such a configuration, it was possible to prepare a microchannel substrate having 2000 joining sections of the dispersed phase and continuous phase on one substrate and in which fine particles could be produced simultaneously at the aforementioned 2000 joining sections. Note that in order to reduce the number of the dispersed-phase introduction inlet and discharge outlet, 2 dispersed-phase introduction channel (5) and 2 discharge channels (7) were communicated by one dispersed-phase introduction inlet (4) and one discharge outlet (8) respectively, at every two units of microchannel structures which were adjacent to each other as shown in FIG. 8. In addition, the microchannel substrate having this microchannel structure was prepared by general photolithography and wet etching processes as in Example 1. The through holes of the continuous-phase introduction inlet, dispersed-phase introduction inlet, and discharge outlet in the microchannel structure were formed as the through holes having a diameter of 1 mm by mechanical processing.

FIG. 23 shows a schematic diagram of the microchannel structural body used in Example 6. As shown in FIG. 23, the microchannel structural body was prepared so that a channel substrate for supplying continuous phase (22) having a reservoir (19) and supplying channel (21) which supplied continuous phase was joined on the top face of the aforementioned microchannel substrate (1), and a channel substrate for supplying dispersed phase (23) having a reservoir (20) and supplying channel (21) which supplied dispersed phase was joined on the bottom face of the aforementioned microchannel substrate (1). Like the microchannel substrate, Pyrex (registered trademark) substrate having a diameter and thickness of 5 inches and 1.2 mm respectively, was used to prepare the channel substrate for supplying continuous phase and channel substrate for supplying dispersed phases joined on the top and bottom faces of the microchannel substrate. In addition, the reservoirs and supply channels formed on the channel substrate for supplying continuous phase and channel substrate for supplying dispersed phase were formed by general photolithography and wet etching processes. The joining of the microchannel substrate with the channel substrate for supplying continuous phase and with the channel substrate for supplying dispersed phase was carried out by a general heat seal process. Note that the through hole (24) of the reservoir of the channel substrate for supplying continuous phase, through hole (25) of the reservoir of the channel substrate for supplying dispersed phase, and through holes of fluid discharge outlet (26) were formed as the through holes having a diameter of 1 mm by mechanical processing. Additionally, the shape of the reservoirs of the channel substrate for supplying continuous phase and channel substrate for supplying dispersed phase was a cylinder having a diameter and depth of 30 mm and 300 µm, respectively. Moreover, linear supply channels were formed radially from the circumferences of the reservoirs. The supply channels from the reservoir of the structural body for supplying continuous phase bad a length, width, and depth of 15 mm, 1 mm, and 300 µm respectively, and 50 of them were formed at an equal interval. The supply channels from the reservoir of the structural body for supplying dispersed phase had a length, width, and depth of 20 mm, 1 mm, and 300 µm respectively, and 25 of them were formed at an equal interval. 25 of the through holes of fluid discharge outlet (26) on the channel substrate for supplying dispersed phase were arranged at positions on a concentric circle having a radius of 55 mm so as to correspond with the positions of discharge outlet (8) of the microchannel substrate (1).

By configuring such a microchannel structural body, the continuous phase introduction inlets and dispersed-phase introduction inlets in respective microchannel structures formed on microchannel substrates could communicate via the linear supply channels arranged radially from the reservoirs which were provided on the channel substrate for supplying continuous phase and channel substrate for supplying dispersed phase joined on the top and bottom faces of the microchannel substrate. Additionally, solution sending pumps for supplying the continuous phase and dispersed phase via Teflon tubes were connected to the through hole (24) of the reservoir on the channel substrate for supplying continuous phase and to the through hole (25) of the reservoir on the channel substrate for supplying dispersed phase of the microchannel structural body, and the continuous phase and dispersed phase were supplied to the microchannel structural body. Moreover, a Teflon tube was also connected to each of 25 fluid discharge outlets formed on the channel substrate for supplying dispersed phase and the slurry containing the produced fine particles was discharged to recover through this Teflon tube. Note that toluene and 4% polyvinyl alcohol aqueous solution were used as the dispersed phase and continuous phase, respectively.

When the dispersed phase and continuous phase were supplied to the present microchannel structural body at supply rates of 1.5 ml/min and 3.0 ml/min respectively, the production of fine particles was observed at the merging section, in which the dispersed phase and continuous phase in the microchannel structural body join, under the condition where both supply rates were stable. When the produced fine particles were observed, the average particle diameter of the fine particles was 85.5 µm and the CV value (%), which indicates the degree of variance of particle diameters, was 7.6% showing that the produced fine particles were uniform. Additionally, the production rate of the slurry, which was obtained by solution sending and which contained fine particles, was 4.5 ml/min. It was shown that by changing the width/dept of microchannels, particle diameter of fine particles could be changed and fine particles could be produced in a large amount.

Example 7

FIG. 4 shows a schematic diagram of the microchannel structure used in Example 7. As shown in FIG. 4, the microchannel Structure used in the present Example had a dispersed-phase introduction channel (5) which communicated with a dispersed-phase introduction inlet (4), continuous-phase introduction channel (3) which communicated with a continuous-phase introduction inlet (2), discharge channel (7) which communicated with a discharge outlet (8), and particle formation channel (9), and in which one end of the particle formation channel (9) communicated with the continuous-phase introduction channel whereas the other end thereof communicated with the discharge channel. The dispersed-phase introduction channel communicated the fine-particle formation channel via 80 branch channels for dispersed-phase instruction (10) which were arranged in parallel with the interval of 0.1 mm. The dispersed-phase introduction channel, continuous-phase introduction channel, discharge channel particle formation channel, and branch channel for dispersed-phase introduction were formed as microchannels and their sizes (i.e. width/depth/length) were (85 µm/32 µm/9.5 mm), (1200 µm/100 µm/11.0 mm), (700 µm/100 µm/11.0 mm), (170 µm/32 µm/4.0 mm), and (13 µm/4 µm/1 mm), respectively. In addition, they were formed so that the lengths of $a_1$, $b_1$, $c_1$, and all the lengths of $a_2$ to $a_n$ in FIG. 4 were 9.5 mm, 11.8 mm, 11.2 mm, and 0.05 mm, restively. Note that the branch channel for dispersed-phase introduction and particle formation channel were formed so that they joined to form an angle of 70°.

Additionally, as shown in FIG. 12, a microchannel substrate, in which only the branch channel for dispersed-phase introduction was formed on one substrate, and microchannel substrate, in which the dispersed-phase introduction channel, continuous-phase introduction channel, discharge channel, and particle formation channel were formed on one substrate, were prepared as a lid substrate (17) and bottom substrate (18) respectively, and a microchannel structure was formed by joining the lid substrate and bottom substrate together. A piece of Pyrex (registered trademark; 70 mm×30 mm×1 mm) substrate was used for both the lid substrate and bottom substrate.

In addition, the respective microchannels formed on the lid substrate and bottom substrate were formed by general photolithography and wet etching processes, and the lid substrate and bottom substrate were joined using a general heat seal process. Moreover, small holes having a diameter of 0.6 mm were provided in advance on the lid substrate at positions which corresponded to the continuous-phase introduction inlet (2), dispersed-phase introduction inlet (4), and discharge outlet (8) using mechanical processing means. Note that the preparation method and substrate material of the present microchannel structure are not limited to the above.

The microchannel substrate where the abovementioned microchannel structures were integrated on one circular substrate was prepared. In other words, 50 units of the microchannel structure, 1 unit of which was formed from the dispersed-phase introduction channel, continuous-phase introduction channel, fine-particle formation channel, discharge channel, and 80 branch channels for dispersed-phase introduction, were arranged in circles on a Pyrex (registered trademark) substrate having a diameter and thickness of 5 inches and 1.2 mm respectively, with an equal interval. The continuous-phase introduction inlet (2), dispersed-phase introduction inlet (4), and discharge outlet (8) in the microchannel structure were arranged so that their positions were on concentric circles having a radius of 30 mm, 35 mm, and 55 mm, respectively. With such a configuration, it was possible to prepare a microchannel substrate having 4000 joining sections of the dispersed phase and continuous phase on one substrate and in which fine particles could be produced simultaneously at the aforementioned 4000 joining sections. Note that in order to reduce the number of the dispersed-phase introduction inlet and discharge outlet, 2 dispersed-phase introduction channels (5) and 2 discharge channels (7) were communicated by one dispersed-phase introduction inlet (4) and one discharge outlet (8) respectively, at every two units of microchannel structures which were adjacent to each other as shown in FIG. 8. In addition, the microchannel substrate having this microchannel structure was prepared by general photolithography and wet etching processes as in Example 1. The through holes of the continuous-phase introduction inlet, dispersed-phase introduction inlet and discharge outlet in the microchannel structure were formed as the through holes having a diameter of 1 mm by mechanical processing.

FIG. 23 shows a schematic diagram of the microchannel structural body used in Example 7. As shown in FIG. 23, the microchannel structural body was prepared so that a channel substrate for supplying continuous phase (22) having a reservoir (19) and supplying channel (21) which supplied continuous phase was joined on the top face of the aforementioned microchannel substrate (1), and a channel substrate for supplying dispersed phase (23) having a reservoir (20) and supplying channel (21) which supplied dispersed phase was joined on the bottom face of the aforementioned microchannel substrate (1). Like the microchannel substrate, Pyrex (registered trademark) substrate having a diameter and thickness of 5 inches and 1.2 mm respectively, was used to prepare the channel substrate for supplying continuous phase and channel substrate for supplying dispersed phase joined on the top and bottom faces of the microchannel substrate. In addition, the reservoirs and supply channels formed on the channel substrate for supplying continuous phase and channel substrate for supplying dispersed phase were formed by general photolithography and wet etching processes. The joining of the microchannel substrate with the channel substrate for supplying continuous phase and with the channel substrate for supplying dispersed phase was carried out by a general heat seal process. Note that the through hole (24) of the reservoir of the channel substrate for supplying continuous phase, through hole (25) of the reservoir of the channel substrate for supplying dispersed phase, and through holes of fluid discharge outlet (26) were formed as the through holes having a diameter of 1 mm by mechanical processing. Additionally, the shape of the reservoirs of the channel substrate for supplying continuous phase and channel substrate for supplying dispersed phase was a cylinder having a diameter and depth of 30 mm and 300 μm, respectively. Moreover, linear supply channels were formed radially from the circumferences of the reservoirs. The supply channels from the reservoir of the structural body for supplying continuous phase had a length, width, and depth of 15 mm, 1 mm, and 300 μm respectively, and 50 of them were formed at an equal interval. The supply channels from the reservoir of the structural body for supplying dispersed phase had a length, width, and depth of 20 mm, 1 mm, and 300 μm respectively, and 25 of them were formed at an equal interval. 25 of the through holes of fluid discharge outlet (26) on the channel substrate for supplying dispersed phase were arranged at positions on a concentric circle having a radius of 55 mm so as to correspond with the positions of discharge outlet (8) of the microchannel substrate (1).

By configuring such a microchannel structural body, the continuous-phase introduction inlets and dispersed-phase introduction inlets in respective microchannel structures formed on microchannel substrates could communicate via the linear supply channels aged radially from the reservoirs which were provided on the channel substrate for supplying continuous phase and channel substrate for supplying dispersed phase. Additionally, solution sending pumps for supplying the continuous phase and dispersed phase via Teflon tubes were connected to the through hole (24) of the reservoir on the channel substrate for supplying continuous phase and to the trough hole (25) of the reservoir on the channel substrate for supplying dispersed phase of the microchannel structural body, and the continuous phase and dispersed phase were supplied to the microchannel structural body. Moreover, a Teflon tube was also connected to each of 25 fluid discharge outlets formed on the channel step for supplying dispersed phase and the slurry containing the produced fine particles was discharged to recover through this Teflon tube. Note that toluene and 4% polyvinyl alcohol aqueous solution were used as the dispersed phase and continuous phase, respectively.

When the dispersed phase and continuous phase were supplied to the present microchannel structural body at supply rates of 0.2 ml/min and 0.4 ml/min respectively, the production of fine particles was observed at the merging section, in which the dispersed phase and continuous phase in the microchannel structural body join, under the condition where both supply rates were stable. When the produced fine particles were observed the average particle diameter of the fine particles was 22.3 μm and the CV value (%), which indicates the degree of variance of particle diameters, was 12.7% showing that the produced fine particles were relatively uniform. Additionally, the production rate of the slurry, which was obtained by solution sending and which contained fine particles, was 0.6 ml/min. It was shown that by changing the width/depth of microchannels, particle diameter of fine particles could be cued and fine particles could be produced in a large amount.

Comparative Example 1

Figure 24:
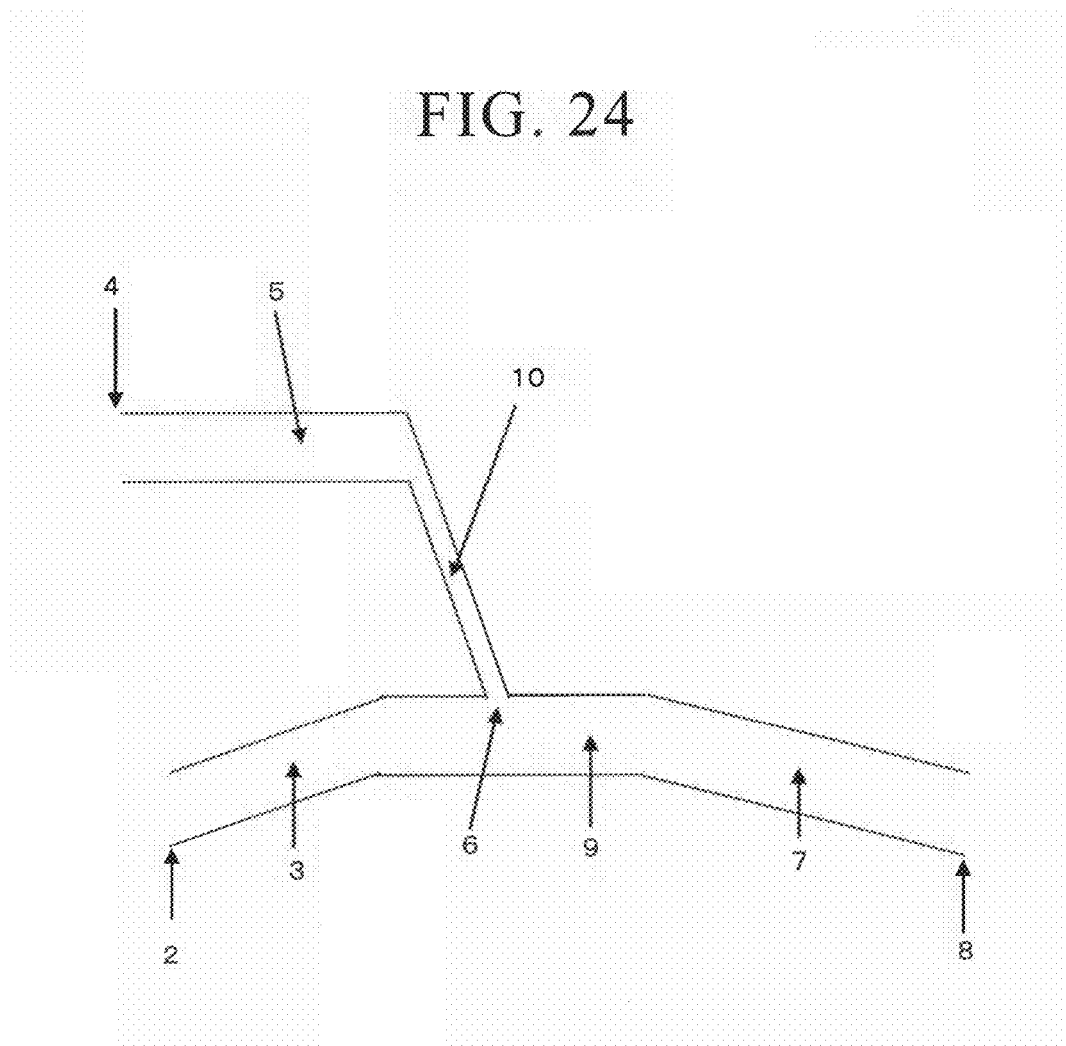
FIG. 24 is a schematic diagram showing a microchannel structure in Comparative Example 1.

FIG. 24 shows a schematic diagram of the microchannel structure used in Comparative Example 1. As shown in FIG. 24, the microchannel structure used in the present Comparative Example had a dispersed-phase introduction channel (5) which communicated with a dispersed-phase introduction inlet (4), continuous-phase introduction channel (3) which communicated with a continuous-phase introduction inlet (2), discharge channel (7) which communicated with a discharge outlet (8), and particle formation channel (9), and in which one end of the particle formation channel communicated with the continuous-phase introduction channel whereas the other end thereof communicated with the discharge channel. The dispersed-phase introduction channel communicated the particle formation channel via 1 branch channel for dispersed-phase introduction (10). The dispersed-phase introduction channel, continuous-phase introduction channel, discharge channel, particle formation channel, and branch channel for dispersed-phase introduction were formed as microchannels and their sizes (i.e. width/depth/length) were (30 μm/25 μm/9.45 mm), (30 μm/25 μm/11.8 mm), (30 μm/25 μm/11.2 mm), (30 μm/25 μm/3.92 mm), and (19 μm/7 μm/3.5 mm), respectively. Note that the branch channel for dispersed-phase introduction and particle formation channel were formed so that they joined to form an angle of 70°.

Additionally, as shown in FIG. 12, a microchannel substrate, in which only the branch channel for dispersed-phase introduction was formed on one substrate, and microchannel substrate, in which the dispersed-phase introduction channel, continuous-phase introduction channel, discharge channel, and fine-particle formation channel were formed on one substrate, were prepared as a lid substrate (17) and bottom substrate (18) respectively, and a microchannel structure was formed by joining the lid substrate and bottom substrate together, Apiece of Pyrex (registered trademark; 70 mm×30 mm×1 mm) substrate was used for both the lid substrate and bottom substrate.

In addition, the respective microchannels formed on the lid substrate and bottom substrate were formed by general photolithography and wet etching processes, and the lid substrate and bottom substrate were joined using a general heat seal process. Moreover, small holes having a diameter of 0.6 mm were provided in advance on the lid substrate at positions which corresponded to the continuous-phase introduction inlet (2), dispersed-phase introduction inlet (4), and discharge outlet (8) using mechanical processing means. Note that the preparation method and substrate material of the present microchannel structure are not limited to the above.

Additionally, microsyringe pumps for supplying the continuous phase and dispersed phase via Teflon tubes were connected to the continuous-phase introduction inlet and dispersed-phase introduction inlet of the microchannel structure and the continuous phase and dispersed phase were supplied to the microchannel structure. Moreover, a Teflon tube was also connected to the discharge outlet and the slurry containing the produced particles was discharged to recover through this Teflon tube. Note that toluene and 4% polyvinyl alcohol aqueous solution were used as the dispersed phase and continuous phase, respectively.

When the dispersed phase and continuous phase were supplied to the present microchannel structure at supply rates of 0.2 μl/min and 0.3 μl/min respectively, the production of fine particles was observed at the merging section, in which the dispersed phase and continuous phase in the microchannel structure body join, under the condition where both supply rates were stable. When the produced fine particles were observed, the avenge particle diameter of the fine particles was 34.2 μm and the CV value (%), which indicates the degree of variance of particle diameters, was 10.5% showing that the produced fine particles were extremely uniform. Additionally, the production rate of the slurry, which was obtained by solution sending and which contained fine particles, was 0.5 μl/min.

Next, when the dispersed phase and continuous phase were supplied to the present microchannel structure at supply rates of 8 μl/min and 12 μl/min respectively, particles could not be produced.

Comparative Example 2

Figure 22:
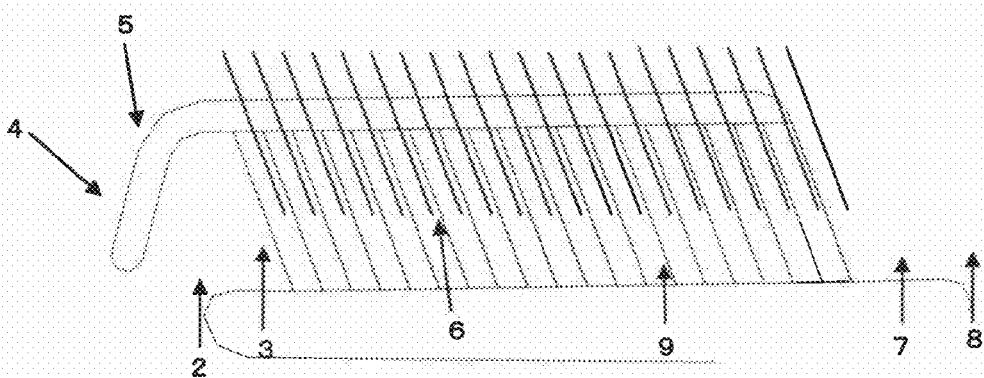
FIG. 22 is a schematic diagram showing a microchannel structure in Comparative Example 2.

FIG. 22 shows a schematic diagram of the microchannel structure used in Comparative Example 2. As shown in FIG. 22, the microchannel structure used in the present Comparative Example had a dispersed-phase introduction channel (5) which communicated with a dispersed-phase introduction inlet (4), continuous-phase introduction channel (3) which communicated with a continuous-phase introduction inlet (2), discharge channel (7) which communicated with a discharge outlet (9), and particle formation channel (9), and in which one end of the particle formation channel communicated with the continuous-phase introduction channel whereas the other end thereof communicated with the discharge channel. The dispersed-phase introduction channel communicated the particle formation channel via 20 branch channels for dispersed-phase introduction (10) with the interval of 0.9 mm. The dispersed-phase introduction channel, continuous-phase introduction channel, discharge channel, particle formation channel, and branch channel for dispersed-phase introduction sere formed as microchannels and their sizes (i.e. width/depth/length) were (1 mm/13 μm/6.64 mm), (2.1 mm/13 μm/2.73 mm), (2.1 mm/13 μm, 3.4 mm), (2.1 μm/13 μm/17.1 mm), and (31 μm/13 μm/7.0 mm), respectively. Note that the branch channel for dispersed-phase introduction and particle formation channel were formed so that they joined to form an angle of 70°. Additionally, as shown in FIG. 11, a microchannel substrate, in which the branch channel for dispersed-phase introduction, dispersed-phase introduction channel, continuous-phase introduction channel, discharge channel, and particle formation channel were formed on one substrate, was prepared as a bottom substrate (18), and a microchannel structure was formed by joining the lid substrate (17) and bottom substrate together. Apiece of Pyrex (registered trademark; 70 mm×30 mm×1 mm) substrate was used for both the lid substrate and bottom substrate.

In addition, the respective microchannels formed on the bottom substrate were formed by general photolithography and wet etching processes, and the lid substrate and bottom substrate were joined using a general heat seal process. Moreover; small holes having a diameter of 0.6 mm were provided in advance on the lid substrate at positions which corresponded to the continuous-phase introduction inlet (2), dispersed-phase introduction inlet (4), and discharge outlet (8) using mechanical processing means. Note that the preparation method and substrate material of the present microchannel structure are not limited to the above.

Additionally, microsyringe pumps for supplying the continuous phase and dispersed phase via Teflon tubes were connected to the continuous-phase introduction inlet and dispersed-phase introduction inlet of the microchannel structure and the continuous phase and dispersed phase were supplied to the microchannel structure. Moreover, a Teflon tube was also connected to the discharge outlet and the slurry containing the produced fine particles was discharged to recover through this Teflon tube. Note that toluene and 0.5% polyvinyl alcohol aqueous solution were used as the dispersed phase and continuous phase, respectively.

When both the dispersed phase and continuous phase were supplied at a supply rate of 50 μl/min, although the production of fine particle was observed, the production was extremely unstable and it was impossible to stably form fine particles having a uniform particle diameter.

While preferred embodiments of the invention have been described and illustrated above, it should be understood that these are exemplary of the invention and are not to be considered as limiting. Additions, omissions, substations, and other modifications can be made without de from the spirit or scope of the present invention. Accordingly, the invention is not to be considered as being limited by the foregoing description, and is only limited by the scope of the appended claims.

What is claimed is:

1. A microchannel structure comprising:
    a dispersed-phase introduction channel which communicates with a dispersed-phase introduction inlet;
    a continuous-phase introduction channel which communicates with a continuous-phase introduction inlet;
    a discharge channel which communicates with a discharge outlet;
    a fine-particle formation channel; and
    a plurality of branch channels for dispersed-phase introduction which are microchannels, wherein
    one end of the fine-particle formation channel in a fluid traveling direction communicates with the continuous-phase introduction channel whereas the other end thereof communicates with the discharge channel,
    a side part of the dispersed-phase introduction channel and a side part of the fine-particle formation channel communicate via the plurality of branch channels for dispersed-phase introduction,
    the plurality of branch channels for dispersed-phase introduction are parallel to one another,
    the plurality of branch channels for dispersed-phase introduction and the fine-particle formation channel join at an arbitrary angle at joining sections in the fine-particle formation channel,
    a cross sectional area of the fine-particle formation channel gradually increases from a communication position thereof with the continuous-phase introduction channel to a communication position thereof with the discharge channel,
    lengths of the branch channels for dispersed-phase introduction gradually increase as the communication positions of the branch channels for dispersed-phase introduction with the dispersed-phase introduction channel depart from the dispersed-phase introduction inlet, and
    the cross sectional area of the fine-particle formation channel and the lengths of the branch channels both gradually increase with a positive correlation with respect to a distance from the continuous-phase introduction channel and the dispersed-phase introduction channel, respectively, such that pressures of a dispersed phase at the branch channels for dispersed-phase introduction are equal and pressures of the dispersed phase at the joining sections with the branch channels are equal, to uniformly distribute a continuous phase to outlets of the dispersed phase of the branch channels.

2. The microchannel structure according to claim 1, wherein a cross sectional area of the plurality of branch channels for dispersed-phase introduction is smaller than the cross sectional area of the fine-particle formation channel.

3. The microchannel structure according to claim 1,
wherein the plurality of branch channels for dispersed-phase introduction are n branch channels for dispersed-phase introduction from $Y_1$, which is the closest branch channel for dispersed-phase introduction to the dispersed-phase introduction inlet, to $Y_n$, which is the furthest branch channel for dispersed-phase introduction from the dispersed-phase introduction inlet; and
wherein when the position of dispersed-phase introduction inlet is $X_0$, the position where $Y_1$ and dispersed-phase introduction channel communicate is $X_1$, the length along the dispersed-phase introduction channel between $X_0$ and $X_1$ is $a_1$, the position where $Y_n$ and dispersed-phase introduction channel communicate is $X_n$, and the length along the dispersed-phase introduction channel between $X_{n-1}$ and $X_n$ is $a_n$, the lengths from $a_2$ to $a_n$ are all equal.

4. The microchannel structure according to any one of claims 1, 2 and 3, wherein the widths and depths of the dispersed-phase introduction channel, continuous-phase introduction channel, fine-particle formation channel, discharge channel, and branch channels for dispersed-phase introduction are different.

5. The microchannel structure according to any one of claims 1, 2 and 3, wherein the widths and depths of the dispersed-phase introduction channel, continuous-phase introduction channel, fine-particle formation channel, discharge channel, and branch channels for dispersed-phase introduction are the same.

6. The microchannel structure according to any one of claims 1, 2 and 3, wherein a width of the branch channels for dispersed-phase introduction or the width of the fine-particle formation channel is partially reduced at a joining section where the branch channel for dispersed-phase introduction and fine-particle formation channel join or in the vicinity thereof.

7. A microchannel structural body comprising two or more microchannel structures according to any one of claims 1, 2 and 3 on a substrate.

8. The microchannel structural body according to claim 7, wherein two or more microchannel structures are arranged on the substrate at an equal interval.

9. The microchannel structural body according to claim 7, wherein the dispersed-phase introduction channel, continuous-phase introduction channel, fine-particle formation channel, discharge channel, and branch channels for dispersed-phase introduction are formed on one substrate.

10. The microchannel structural body according to claim 7, wherein the dispersed-phase introduction channel, continuous-phase introduction channel, fine-particle formation channel, discharge channel, and branch channel for dispersed-phase introduction are formed on two or more substrates.

11. The microchannel structural body according to claim 7, wherein the widths and depths of each dispersed-phase introduction channel, continuous-phase introduction channel, fine-particle formation channel, discharge channel, and branch channels for dispersed-phase introduction between each of the two or more microchannel structures are different.

12. The microchannel structural body according to claim 7, wherein a width of the branch channels for dispersed-phase introduction or the width of the fine-particle formation channel is partially reduced at a joining section where the branch channel for dispersed-phase introduction and fine-particle formation channel join or in the vicinity thereof.

13. A microchannel-structure laminated body which is a microchannel-structure laminated body in which two or more microchannel structural bodies according to claim 7 are laminated, wherein a dispersed-phase introduction inlet, continuous-phase introduction inlet, and discharge outlet in said microchannel structural bodies penetrate substrates thereof.

14. The microchannel-structure laminated body according to claim 13, wherein a width of the branch channels for dispersed-phase introduction or the width of the fine-particle formation channel is partially reduced at a joining section where the branch channel for dispersed-phase introduction and fine-particle formation channel join or in the vicinity thereof.

15. The microchannel structural body according to claim 7, wherein the widths and depths of each dispersed-phase introduction channel, continuous-phase introduction channel, fine-particle formation channel, discharge channel, and branch channels for dispersed-phase introduction between each of the two or more microchannel structures are the same.

\* \* \* \* \*